(12) United States Patent
Yallen et al.

(10) Patent No.: US 12,306,910 B2
(45) Date of Patent: *May 20, 2025

(54) SYSTEM AND METHOD FOR MARKERLESS MOTION CAPTURE

(71) Applicant: Metatope LLC, Woodland Hills, CA (US)

(72) Inventors: Jordan Yallen, Los Angeles, CA (US); Walker Holmes, Indialantic, FL (US); Joseph Poulose, Chatsworth, CA (US)

(73) Assignee: Metatope LLC, Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,091

(22) Filed: Dec. 29, 2023

(65) Prior Publication Data

US 2024/0134941 A1    Apr. 25, 2024

Related U.S. Application Data

(63) Continuation of application No. 18/193,271, filed on Mar. 30, 2023, now Pat. No. 11,860,981.

(Continued)

(51) Int. Cl.
*G06F 21/10* (2013.01)
*G06T 13/40* (2011.01)
(Continued)

(52) U.S. Cl.
CPC .............. *G06F 21/10* (2013.01); *G06T 13/40* (2013.01); *G06T 17/00* (2013.01); *G06V 40/171* (2022.01);
(Continued)

(58) Field of Classification Search
None
See application file for complete search history.

(56) References Cited

U.S. PATENT DOCUMENTS

2006/0235790 A1   10/2006   Jung et al.
2009/0177977 A1   7/2009    Jones et al.
(Continued)

OTHER PUBLICATIONS

International Search Report and Written Opinion for Application No. PCT/US2023/065160, mailed on Jul. 12, 2023, 8 Pages.
(Continued)

*Primary Examiner* — Peter Hoang
(74) *Attorney, Agent, or Firm* — DLA PIPER LLP (US)

(57) ABSTRACT

A computing system captures markerless motion data of a user via a camera of the computing system. The computing system retargets the first plurality of points and the second plurality of points to a three-dimensional model of an avatar associated with the user, wherein the avatar is associated with an identity non-fungible token that uniquely represents the user across Web2 environments and Web3 environments, and wherein retargeting the first plurality of points and the second plurality of points animates the three-dimensional model of the avatar. The computing system renders a video local to the computing system, wherein the video comprises the markerless motion data of the user retargeted to the three-dimensional model of the avatar causing hands, face, and body of the avatar to be animated in real-time. The computing system causes a non-fungible token to be generated, the non-fungible token uniquely identifying ownership of the video.

20 Claims, 22 Drawing Sheets

Related U.S. Application Data

(60) Provisional application No. 63/362,179, filed on Mar. 30, 2022, provisional application No. 63/369,734, filed on Jul. 28, 2022, provisional application No. 63/362,860, filed on Apr. 12, 2022, provisional application No. 63/369,735, filed on Jul. 28, 2022, provisional application No. 63/382,314, filed on Nov. 4, 2022.

(51) Int. Cl.
| | |
|---|---|
| *G06T 17/00* | (2006.01) |
| *G06V 40/16* | (2022.01) |
| *H04N 21/8358* | (2011.01) |
| *H04N 21/84* | (2011.01) |

(52) U.S. Cl.
CPC ......... *H04N 21/8358* (2013.01); *H04N 21/84* (2013.01); *G06F 21/1014* (2023.08)

(56) References Cited

U.S. PATENT DOCUMENTS

| | | |
|---|---|---|
| 2010/0228633 A1 | 9/2010 | Guimarães et al. |
| 2012/0266256 A1 | 10/2012 | Kawachiya et al. |
| 2019/0035149 A1 | 1/2019 | Chen et al. |
| 2020/0234481 A1* | 7/2020 | Scapel .................. A63F 13/213 |
| 2021/0256070 A1 | 8/2021 | Tran et al. |
| 2021/0279695 A1 | 9/2021 | Rice |

OTHER PUBLICATIONS

DeppMotion, "DeepMotion: Animate 3D | Markerless Face Tracking | V3.0 Release," YouTube, https://www.youtube.com/watch?v=PGjqa30601k, Jul. 1, 2021, pp. 1-11.

International Search Report and Written Opinion for Application No. PCT/US2023/65161, mailed on Jun. 28, 2023, 10 pages.

Moreno I., et al., "Marker-Less Feature and Gesture Detection for an Interactive Mixed Reality Avatar," Sep. 2015, 12 pages, [retrieved on May 23, 2023], Retrieved from the Internet URL: https://ieeexplore.ieee.org/abstract/document/7330433.

Wang Q., et al. "Non-Fungible Token (NFT): Overview, Evaluation, Opportunities and Challenges," arXiv:2105.07447, Oct. 25, 2021, 22 pages.

\* cited by examiner

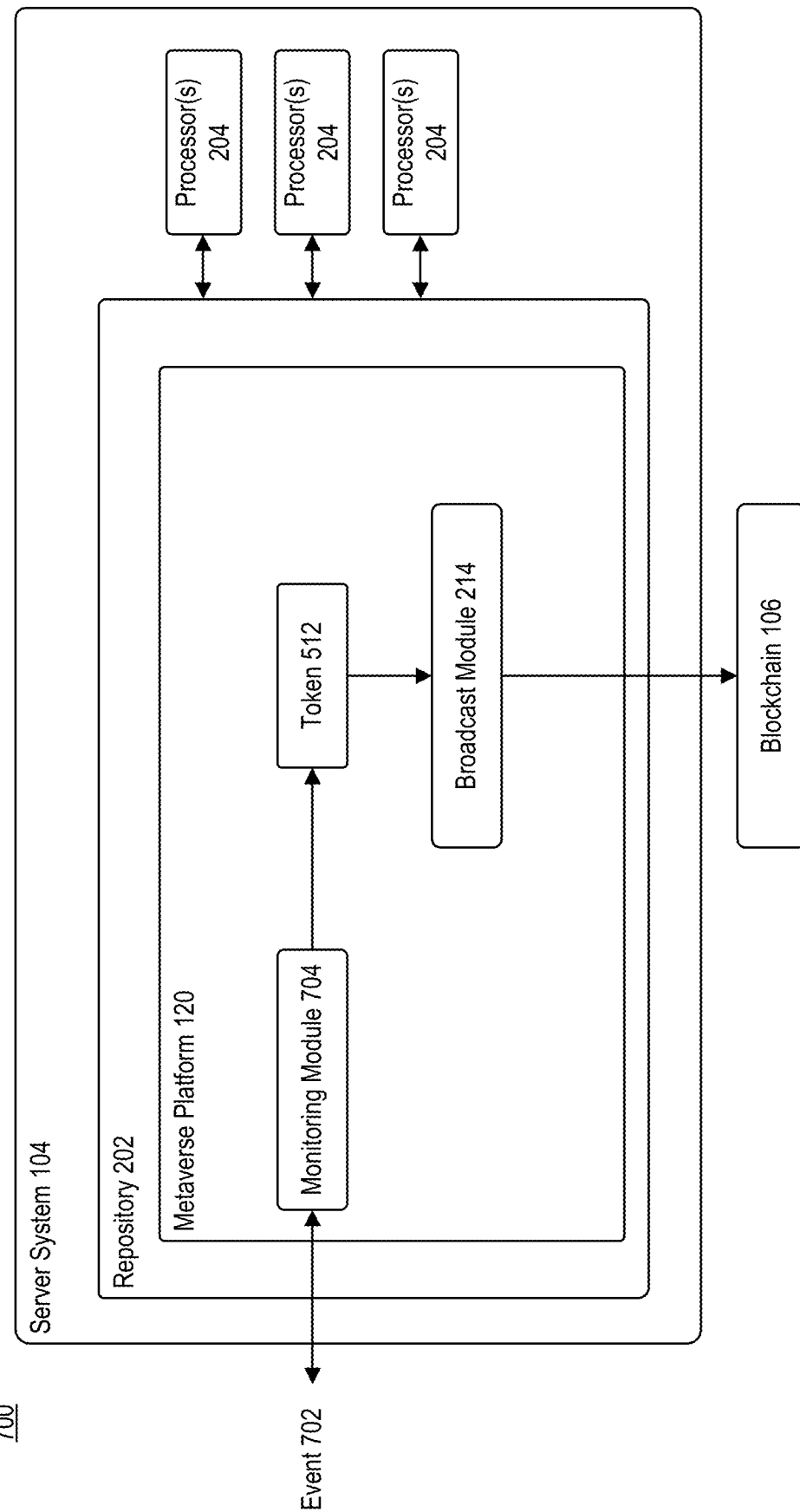

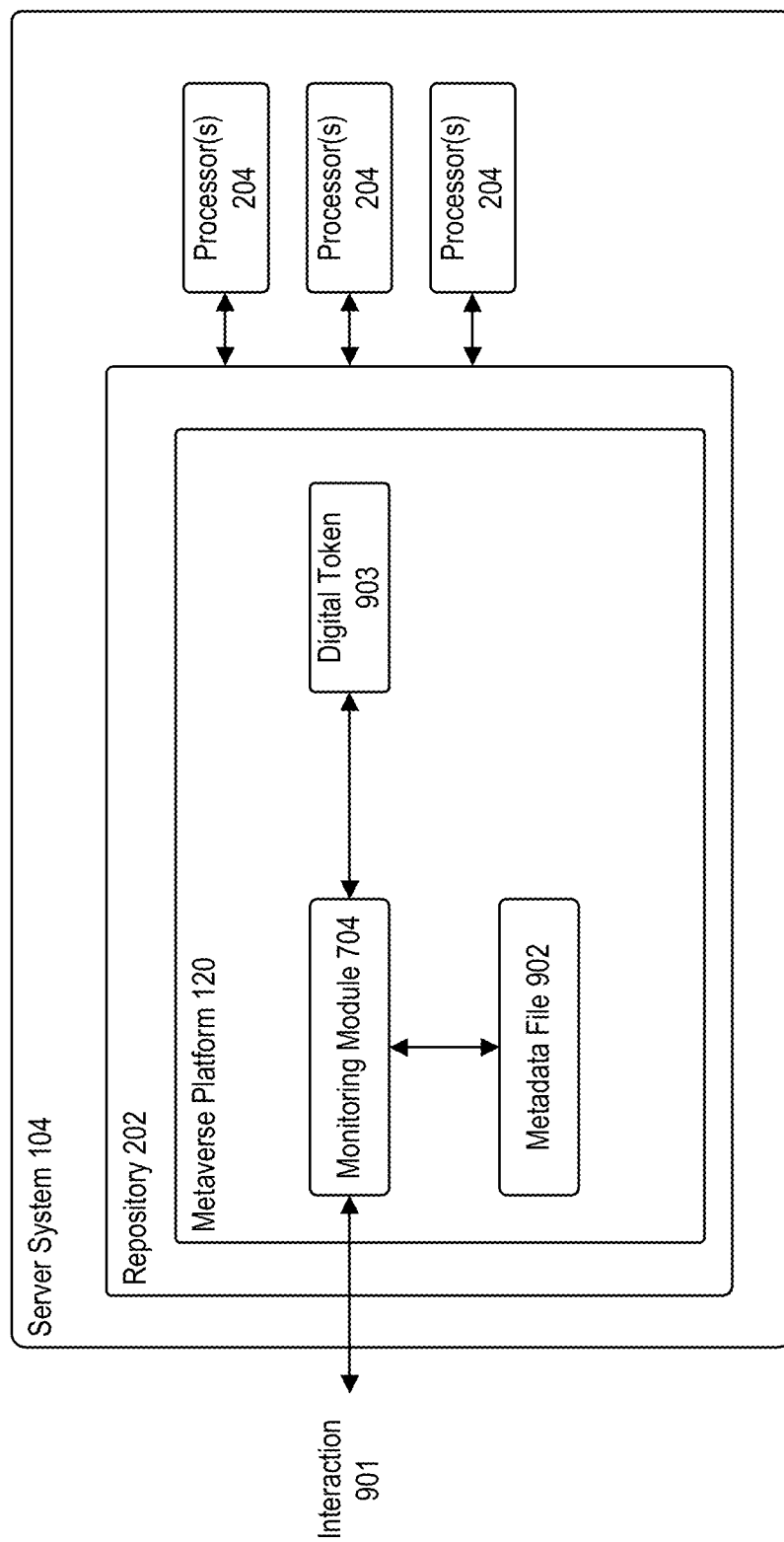

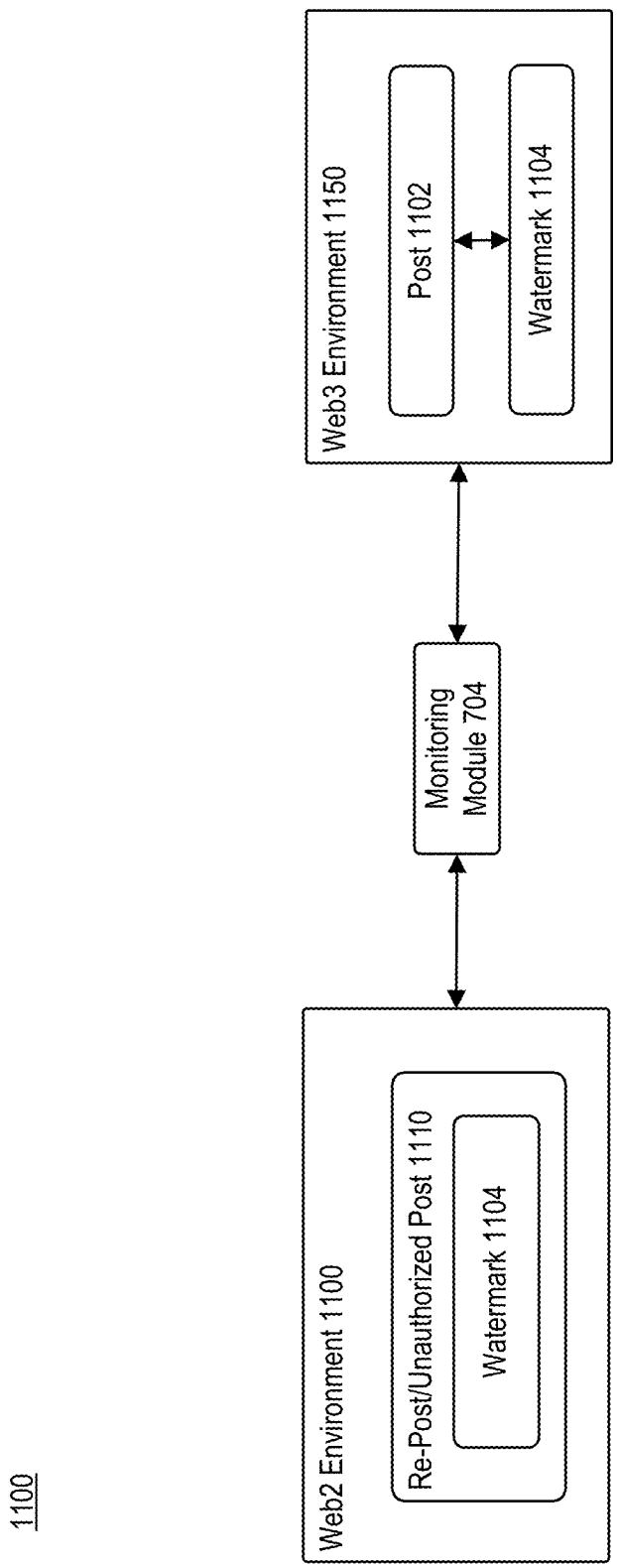

SYSTEM AND METHOD FOR MARKERLESS MOTION CAPTURE

CROSS-REFERENCE TO RELATED APPLICATIONS

This application is a continuation of U.S. patent application Ser. No. 18/193,271, filed Mar. 30, 2023, which claims priority to U.S. Provisional Application No. 63/362,179, filed Mar. 30, 2022, U.S. Provisional Application No. 63/369,734, filed Jul. 28, 2022, U.S. Provisional Application No. 63/362,860 filed Apr. 12, 2022, U.S. Provisional Application No. 63/369,735, filed Jul. 28, 2022, and U.S. Provisional Application No. 63/382,314, filed Nov. 4, 2022, all of which are hereby incorporated by reference in their entireties.

FIELD OF THE DISCLOSURE

Embodiments disclosed herein generally related to a metaverse environment.

BACKGROUND

Recently, non-fungible tokens have become a popular means for users to protect their content. For example, users are able to use a variety of platforms to tokenize their content, such that they retain ownership over that content. With the tokenized version of their content, the user can verify and transfer ownership of the content and even profit off their content by transferring the tokenized version of their content to other users.

SUMMARY

In some embodiments, a method is disclosed herein. A computing system captures markerless motion data of a user via a camera of the computing system. The capturing includes capturing a first portion of the markerless motion data of the user, wherein the first portion of the markerless motion data of the user is captured within a threshold distance of the camera, the capturing comprising identifying a first plurality of points of the user to focus on. The capturing further includes capturing a second portion of the markerless motion data of the user, wherein the second portion of the markerless motion data of the user is capture outside the threshold distance of the camera, the capturing comprising identifying a second plurality of points of the user to focus on, wherein the first plurality of points includes at least one point not included in the second plurality of points and wherein the second plurality of points includes at least one point not included in the first plurality of points. The computing system retargets the first plurality of points and the second plurality of points to a three-dimensional model of an avatar associated with the user, wherein the avatar is associated with an identity non-fungible token that uniquely represents the user across Web2 environments and Web3 environments, and wherein retargeting the first plurality of points and the second plurality of points animates the three-dimensional model of the avatar. The computing system renders a video local to the computing system, wherein the video comprises the markerless motion data of the user retargeted to the three-dimensional model of the avatar causing hands, face, and body of the avatar to be animated in real-time. The computing system causes a non-fungible token to be generated, the non-fungible token uniquely identifying ownership of the video.

In some embodiments, a non-transitory computer readable medium is disclosed herein. The non-transitory computer readable medium includes one or more sequences of instructions, which, when executed by a processor, causes a computing system to perform operations. The operations include capturing, by a camera of the computing system, markerless motion data of a user. The capturing includes capturing a first portion of the markerless motion data of the user, wherein the first portion of the markerless motion data of the user is captured within a threshold distance of the camera, the capturing including identifying a first plurality of points of the user to focus on. The capturing further includes capturing a second portion of the markerless motion data of the user, wherein the second portion of the markerless motion data of the user is capture outside the threshold distance of the camera, the capturing comprising identifying a second plurality of points of the user to focus on, wherein the first plurality of points includes at least one point not included in the second plurality of points and wherein the second plurality of points includes at least one point not included in the first plurality of points. The operations further include retargeting, by the computing system, the first plurality of points and the second plurality of points to a three-dimensional model of an avatar associated with the user, wherein the avatar is associated with an identity non-fungible token that uniquely represents the user across Web2 environments and Web3 environments, and wherein retargeting the first plurality of points and the second plurality of points animates the three-dimensional model of the avatar. The operations further include rendering, by the computing system, a video local to the computing system, wherein the video comprises the markerless motion data of the user retargeted to the three-dimensional model of the avatar causing hands, face, and body of the avatar to be animated in real-time. The operations further include causing, by the computing system, a non-fungible token to be generated, the non-fungible token uniquely identifying ownership of the video.

In some embodiments, a system is disclosed herein. The system includes a processor and a memory. The memory has programming instructions stored thereon, which, when executed by the processor, causes the system to perform operations. The operations include capturing, by a camera, markerless motion data of a user. The capturing includes capturing a first portion of the markerless motion data of the user, wherein the first portion of the markerless motion data of the user is captured within a threshold distance of the camera, the capturing comprising identifying a first plurality of points of the user to focus on. The capturing further includes capturing a second portion of the markerless motion data of the user, wherein the second portion of the markerless motion data of the user is capture outside the threshold distance of the camera, the capturing comprising identifying a second plurality of points of the user to focus on, wherein the first plurality of points includes at least one point not included in the second plurality of points and wherein the second plurality of points includes at least one point not included in the first plurality of points. The operations further include retargeting the first plurality of points and the second plurality of points to a three-dimensional model of an avatar associated with the user, wherein the avatar is associated with an identity non-fungible token that uniquely represents the user across Web2 environments and Web3 environments, and wherein retargeting the first plurality of points and the second plurality of points animates the three-dimensional model of the avatar. The operations further include locally rendering a video, wherein the video comprises the markerless motion data of the user retargeted to the three-dimensional model of the avatar causing hands, face, and body of the avatar to be animated in real-time. The operations further include causing a non-fungible token to be generated, the non-fungible token uniquely identifying ownership of the video.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 7 is a block diagram illustrating server system of FIG. 1, according to example embodiments.

FIG. 9A is a block diagram illustrating server system, according to example embodiments.

FIG. 11A is a block diagram illustrating a computing environment, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques described herein provide a new non-fungible token platform that allows users to take ownership over digital avatars, accessories for these avatars, and digital content that the user produces. For example, one or more techniques described herein allow users to use their non-fungible token avatars in photos and videos, which they can then share to social media platforms.

The term "user" as used herein includes, for example, a person or entity that owns a computing device or wireless device; a person or entity that operates or utilizes a computing device or wireless device; or a person or entity that is otherwise associated with a computing device or wireless device. It is contemplated that the term "user" is not intended to be limiting and may include various examples beyond those described. In some embodiments, a user may be a content creator. In some embodiments, a user may be an owner of a non-fungible token of an avatar, a post, or an accessory. In some embodiments, a user can be both the owner of the non-fungible token and the content creator. In some embodiments, a user can be a person interacting with social content.

The term "metaverse" as used herein may be representative of a centralized or decentralized environment that may be accessible to end users via one or more computing devices that include, but are not limited to, mobile devices, computing devices (e.g., tablets, laptops, personal computers, etc.), wearable devices, and extended reality (XR) devices (e.g., augmented reality devices, virtual reality device). Generally, the metaverse may refer to an environment that includes both real-world components and virtual components. In some embodiments, the metaverse may refer to a single metaverse environment. In some embodiments, the metaverse may refer to multiple metaverse environments, akin to a multiverse.

The term "digital content" as used herein includes, for example, audio content (e.g., podcasts, songs, audiobooks, etc.), image content, video content, and/or any combination of one or more of audio content, image content, and video content.

Figure 1:
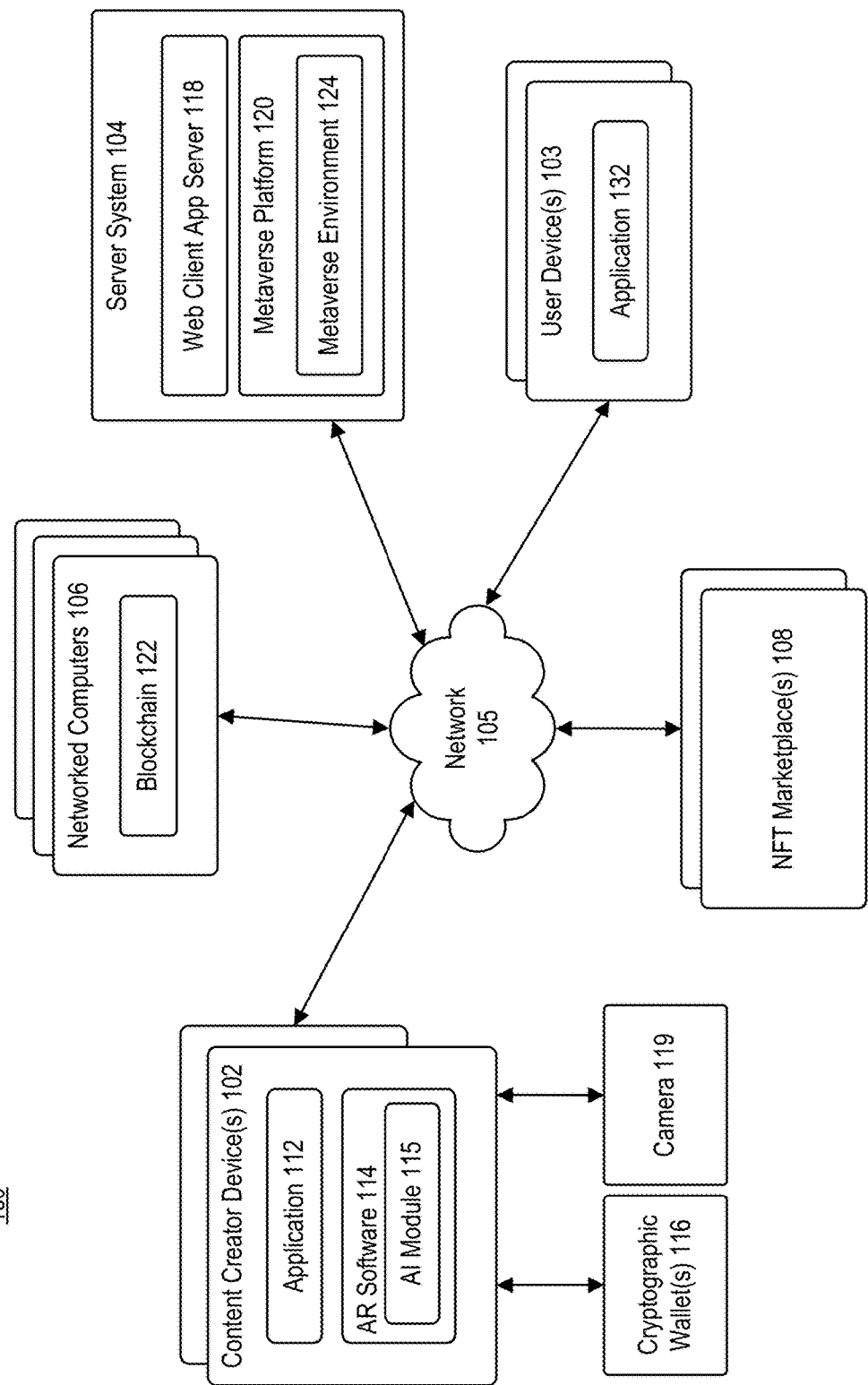
FIG. 1 is a block diagram illustrating a computing environment, according to one exemplary embodiment.

FIG. 1 is a block diagram illustrating computing environment 100, according to one embodiment. Computing environment 100 may include at least one or more user devices 102, one or more user devices 103, a server system 104, a blockchain 122, and one or more non-fungible token marketplaces 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be the Internet, a private data network, virtual private network using a public network and/or other suitable connection(s) that enables components in computing environment 100 to send and receive information between the components of computing environment 100.

User device 102 may be operated by user. User device 102 may be representative of a mobile device, a tablet, a desktop computer, virtual reality (VR) system, augmented reality (AR) system, extended reality (XR) system, or any computing system having the capabilities described herein. User device 102 may include at least application 112 and AR software 114.

Application 112 may be representative of a social media application associated with server system 104. In some embodiments, application 112 may be a standalone application associated with server system 104. In some embodiments, application 112 may be representative of a web-browser configured to communicate with server system 104. In some embodiments, user device 102 may communicate over network 105 to request a webpage, for example, from web client application server 118 of server system 104. For example, user device 102 may be configured to execute application 112 to enter a social media website existing on the metaverse and hosted by web client application server 118. The content that is displayed to user device 102 may be transmitted from web client application server 118 to user device 102, and subsequently processed by application 112 for display through a graphical user interface (GUI) of user device 102.

AR software 114 may be representative of a native or third party software that allows users to create augmented reality images or videos. In some embodiments, AR software 114 may be representative of one or more of Google's markerless motion tracking software; ARKit®, which is a software development kit (SDK) commercially available from Apple®, MediaPipe, which is a machine learning base that can be customized and is commercially available from Google®; ARCore, which is a software development kit developed by Google®, or the like, or any combination thereof, that allows users to, in part, generate augmented reality videos and/or images. A user of user device 102 may use AR software 114 to generate a video or image of themselves and replace themselves in the video or image with their own digital avatar or insert their own digital avatar into the video or image. These videos and/or images may be posted to a user's social media account with metaverse platform 120 via application 112.

In some embodiments, rather than having AR software 114 be separate from application 112, application 112 may include AR software 114. In other words, a user may utilize AR software of application 112 to generate videos or images with their own digital avatar.

Generally, AR software 114 may provide for live tracking of the body, the face, and hands of a user or users. Compared to existing AR software solutions, AR software 114 is the first markerless motion capture software that allows for live tracking of the body, the face, and the hands simultaneously. In operation, AR software 114 may be configured to extract over a plurality of reference points or landmarks (e.g., at least 30) from an individual captured within a field of view of a camera 119 of user device 102. Using the plurality of reference points, AR software 114 may access one or more third party APIs or SDKs such that a skeleton structure of the user can be generated. Once the skeleton structure of the user is generated, AR software 114 may locally retarget, in real-time or near real-time, data in the skeleton structure to the avatar to animate the avatar. In this manner, AR software 114 may allow a user to locally render avatars on user device 102.

In conventional systems, AR software typically has difficulty when toggling between distance shots and close-range shots. To account for this, AR software 114 may include an artificial intelligence module 115. Artificial intelligence module 115 may be configured such that, when user device 102 is in close range of the user (e.g., when the user's face fills up a threshold percentage of the screen), artificial intelligence module 115 may be configured to lock the chest of the user to the bottom of the screen. Once the user's body is locked in, AR software 114 may then prioritize focusing on the face and hands of the user, instead of searching for the rest of the user's body. In some embodiments, rather than locking the user's body, there may be a smooth transition when the user moves from close range to far range or vice versa.

Artificial intelligence module 115 may be trained to determine how to focus a camera 119 of user device 102, depending on if the user is triggering a selfie mode or a full body mode. For example, in full body mode, artificial intelligence module 115 may be trained to identify a plurality of anchor points on the user's body. AR software 114 may focus less on face anchor points when the user's full body is in frame. In such example, user may be able to open and close their mouth and eyes, smile, or frown; but user may not be able to make as many facial expressions as they otherwise would in selfie mode. However, in full body mode, because artificial intelligence module 115 may instruct AR software 114 to focus less on processing power toward the user's face, AR software 114 may be able to capture the hands and rest of the user's body more accurately. In selfie mode, rather than change the plurality of anchor points, artificial intelligence module 115 may be trained to ignore a subset of anchor points, depending on the distance of the user from camera 119. For example, AR software 114 may ignore all leg anchor points when in selfie mode and artificial intelligence module 115 may instruct AR software 114 to focus less on the lower body and more on the user's face, so AR software 114 may be able to capture facial gestures more accurately.

Further, in most conventional technology that is publicly available is limited to only tracking the user's face or generally tracking the user's body without more precise finger tracking and face tracking. AR software 114 improves upon the current state of the art by providing the ability to merge body tracking from head to toe, precise finger tracking, and more precise face tracking. For example, AR software 114 may provide the ability for a user to make two peace signs next to their face, and have a model overlaid to reflect that on their phone screen using their phone camera 119 or any other sensors available to user device 102 (e.g., LIDAR sensor). AR software 114 may thus be able to track all of the user's hand, face, and body movements in real time.

To facilitate such approach, AR software 114 may manage several different PointPools, with each pool representing a different body part. In some embodiments, there are four main PointPools being used: Body (head, arms, legs, feet), LHand (left hand), RHand (right hand), Face (facial landmarks).

AR software 114 may fill these point pools through, for example, a multithreaded process running in the background. Each RGB frame may be captured from a designated streaming camera and stored in a texture object using a GPU command. AR software 114 may provide these texture objects to, for example, one or more computer vision SDKs and/or APIs to process. From these textures, AR software 114 may generate landmarks, which are structures of unfiltered vectors representing what AR software 114 may think the body points of a person on the camera should be in 3D space. AR software 114 may take those landmark points and translate them to a compatible vector for processing (e.g., Unity Vector3s).

In some embodiments, each point or point pool may be designated its own processing pipeline through which the points flow through. In some embodiments, the points in their raw form are too unreliable to be sent straight into the inverse kinematics system. Accordingly, the pipelines may be utilized to make corrections to the points. In some embodiments, the pipelines may include low pass filters, such as Kalman filters and box filters in order to filter out the noise and inaccuracies from the machine learning. In some embodiments, the pipelines may also include multiple correction objects specific to certain body PointPools to represent the points as accurately in 3D space as possible. The pipelines may interact with each other to correct multiple different parts of the body using other parts as points of reference.

Once the points have been corrected and adjusted by the pipelines, AR software 114 may compile them into a single object containing all the points and may use an inverse kinematics (IK) system to calculate the proper model transformations. The IK system may include two sets of classes, one of which polls this object per frame to get the most recent body positions, and another that sets the positions and rotations of the model. Two separate calculations may be used to set the body transforms based on the distance of the source person from camera 119. When the person on camera 119 is far, AR software 114 may use a Quaternion based IK system that rotates the body segments so that the body's forward vector matches the machine learning's corrected points' forward vector. In some embodiments, server system 104 may utilize machine learning to train AR software 114 to anticipate user rotation and placement of the body to accurately predict how the user may move when recording a video and improve filters.

In some embodiments, such as when the person is close or the model being retargeted has unique proportions, AR software 114 may use additional or alternate filter systems, such as forward and backward reaching inverse kinematics (FABRIK) instead of the default IK system in place.

In some embodiments, AR software 114 may use a combination of the IK system with ARKit or ARCore, trading in performance for more stability and accuracy. In some embodiments, separate pipelines can be made by filtering in point data from those two sources if the device can handle it.

In some embodiments, AR software 114 may utilize forward kinematics or other methods.

In some embodiments, AR software 114 may be configured to capture and retarget data to animate a user's asset (e.g., avatar token). Such data from the user's movements can be retargeted. For example, such movement information may be retargeted to gamify social media. For example, on a social media platform, such as TikTok, AR software 114 may be used to capture user motion data from movements in dancing trend videos or posts. The movement data can be retargeted to determine accuracy in movement or other metrics based on the movement captured and the game being played. In some embodiments, AR software 114 may be configured to issue scores based on the most accurate "best" dance.

In some embodiments, AR software 114 may be configured to animate multiple objects in addition to multiple people. For example, AR software 114 may be configured to recognize a soccer ball and separately track the soccer ball. In some embodiments, rather than AR software 114 being utilized to recognize objects, an artificial intelligence engine or computer vision engine may be trained to recognize objects and separately track those objects, with or without sensors or the object. Such information may be used to provide feedback regarding the movement of those objects.

In some embodiments, AR software 114 may be used to animate objects in the real world to drive users on a trail, hunt, or to a specific retail location.

In some embodiments, the process of rendering a user's digital avatar on a video or image generated by user device 102 using AR software 114 may involve a hybrid approach that combines real-time local rendering with higher quality remote rendering or delayed local rendering. For example, a user can capture a video or image using client device 102. Client device 102 may perform real-time local rendering of the image or video while the user is capturing the video or image. For example, AR software 114 may perform a real-time local rendering of the user's digital avatar. This rendering may utilize one or more techniques discussed above, such as three-dimensional modeling, image-based rendering, or depth-based rendering. The purpose of this real-time rendering is to provide a quick preview of the content, allowing the user to see how their digital avatar will appear in the final output. In some cases, the preview of the content may be sufficient, and the user may save and utilize the content rather than choosing to wait for the final, delayed output.

In some embodiments, in addition to the real-time local rendering, AR software 114 may either send the user's video or image to a remote server (e.g., server system 104) or perform a delayed local rendering on the user device 102. The remote server or the delayed local rendering process may be responsible for producing a higher quality version of the user's digital avatar and movements. When the remote server rendering option is used, server system 104 may receive the user's video or image, process it using more advanced rendering techniques or computational resources, and generate a higher quality rendering of the user's digital avatar and movements. This process may involve leveraging powerful GPUs, neural networks, or other hardware and software resources to enhance the quality of the avatar rendering. Once the server system 104 has completed rendering the high-quality digital avatar, or the delayed local rendering process is complete, the final output is either sent back to user device 102 or saved locally on user device 102. The user can now view, share, or interact with the higher quality rendering of their digital avatar overlaid on the original video or image, or in another environment of their choosing. By employing a hybrid approach, AR software 114 may provide users with a real-time preview of their digital avatar in the captured content, while also ensuring a higher quality output is available later. This approach takes advantage of the strengths of both local and remote rendering or delayed local rendering, offering a balance between real-time interaction and high-quality results. In some embodiments, the raw point pool data may be saved separately and utilize this hybrid approach to smooth any inconsistencies, tracking errors, and missing data points for a higher fidelity render. This approach requires less data to be saved or cached and provides expedited upload and rendering speeds.

Figure 19:
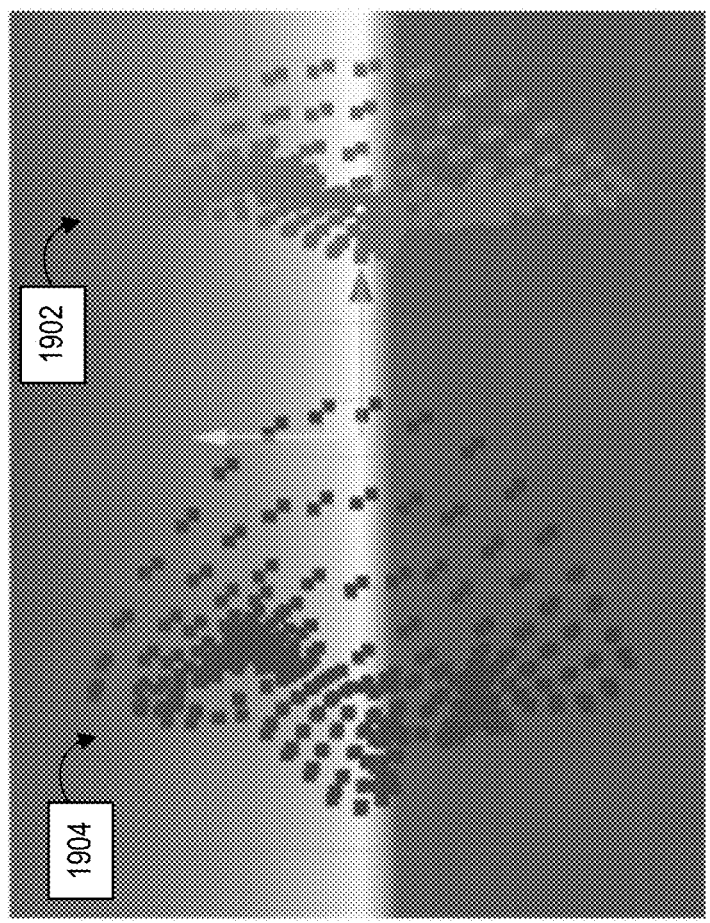
FIG. 19 is a block diagram illustrating a set of points, according to example embodiments.

FIG. 19 is a block diagram illustrating a set of points, according to example embodiments. As shown, FIG. 19 includes a first set of points 1902 and a second set of points 1904 on a user's face. First set of points 1902 may represent a set of points prior to the pipeline adjustments. Second set of points 1904 may represent a set of points after the pipeline adjustments. As seen, first set of points 1902 of the user's face appears flat and may lack depth. First set of points 1902 may pass through the one or more filters, as discussed above, to generate second set of points 1904. As shown, second set of points 1904 may better illustrate depth and rotation of the user's face. As those skilled in the art understand, such process can be applied to other parts of the user's body.

As shown, in some embodiments, each user device 102 may be in communication with a respective cryptographic wallet 116. Cryptographic wallet 116 may be configured to store the user's fungible tokens (e.g., cryptocurrency) and non-fungible tokens in an encrypted manner. In some embodiments, cryptographic wallet 116 may be representative of a hot wallet (e.g., Coinbase, Metamask, etc.), which is a cryptographic wallet 116 connected to network 105. In some embodiments, cryptographic wallet 116 may be representative of a cold wallet (e.g., Ledger Nano X, Trezor Model T, and the like). In some embodiments, cryptographic wallet 116 may be incorporated within application 112. For example, rather than a user storing their fungible tokens and/or non-fungible tokens via a third party wallet, the user may leverage a cryptographic wallet associated with server system 104 via application 112.

User device 103 may be operated by user. User device 103 may be representative of a mobile device, a tablet, a desktop computer, virtual reality (VR) system, augmented reality (AR) system, extended reality (XR) system, or any computing system having the capabilities described herein. User device 103 may include at least application 132.

Application 132 may be representative of a social media application associated with server system 104. In some embodiments, application 132 may be a standalone application associated with server system 104. In some embodiments, application 132 may be representative of a web-browser configured to communicate with server system 104. In some embodiments, user device 103 may communicate over network 105 to request a webpage, for example, from web client application server 118 of server system 104. For example, user device 103 may be configured to execute application 132 to enter a social media website existing on the metaverse and hosted by web client application server 118. The content that is displayed to user device 103 may be transmitted from web client application server 118 to user device 103, and subsequently processed by application 132 for display through a graphical user interface (GUI) of user device 103.

Server system 104 may be configured to host a metaverse application accessible to user devices 102 and user devices 103. For example, server system 104 may include web client application server 118 and metaverse platform 120. Metaverse platform 120 may be configured to host digital content generated by a user and facilitate digital interaction with the digital content within a metaverse environment. For example, metaverse platform 120 may be configured to host a simulated virtual environment in which users can post images or videos of their avatar within the simulated virtual environment. For example, metaverse platform 120 may allow users to take ownership over digital avatars, accessories for these avatars, and social content that users produce whether they use these avatars or not.

In some embodiments, a user may access metaverse environment 124 using one or more third party authentication techniques. For example, a user may access metaverse environment 124 by using "Login with Ethereum virtual machine (EVM) compatible wallet" functionality, thus allowing the user to be verified using their Ethereum accounts.

In some embodiments, a user of metaverse platform 120 may include a unique avatar. The user's unique avatar may be minted as a non-fungible token such that no two users have the same exact avatar. In some embodiments, each avatar may include certain traits that may be treated as default traits but could ultimately be replaced. For example, each avatar may include default clothing or default hair, which ultimately can be replaced by the owner. Using AR software 114, a user can create digital content to post to metaverse platform 120. The content may be representative of a video data, audio data, and/or video data. In some embodiments, the digital content may include an image or video of the user, in which the user's non-fungible token avatar is used in the video or image.

When a user creates a post to metaverse platform 120, in some embodiments, the digital content may be immediately represented as a non-fungible token through a process referred to as "post-to-mint." In some embodiments, initially, the non-fungible token is not minted onto blockchain 122 until a transaction takes place. A transaction may refer to a buying or selling of the non-fungible token corresponding to the user's post. Such process may provide users with a gasless mint process for the users, while also instantaneously allowing users to have a marketable product in the form of a non-fungible token.

The digital content may be displayed on the user's profile, the profile of the owner of the content, a licensee of the content, a tagged user in the content, or the like. In some embodiments, other users and/or community members can interact with the post on the user's profile. In some embodiments, interactions may come in the form of engagements or offers.

In some embodiments, metaverse platform 120 may support a "use-to-earn" model. For example, metaverse platform 120 may facilitate organic engagements (i.e., user interactions) to create activity and drive adoption of the platform, as well as reward or otherwise provide value to creators and owners of content. To do so, each post may be associated with a score. The score may be representative of a cumulative score of how many likes, shares, and other interactions a post receives. In some embodiments, certain activities will be rewarded with a higher score, ad points, and/or fungible tokens unique to metaverse platform 120 (e.g., "utility token"). In this manner, engagements such as likes, shares, views/plays, and comments can create a financial incentive for the end-user.

In some embodiments, the utility token may take the form of an ERC20 token broadcast or written to blockchain 122. For example, the utility token may follow the Standard Openzeppelin Mintable ERC20 standard. The utility tokens may initially be held by an entity associated with server system 104. For example, the ERC20 tokens may be deployed from and owned by the entity using a Gnosis Multisig wallet, thus allowing administrators to retain control over the tokens until transferred to a user.

Accordingly, unlike conventional metaverse or social media environments, metaverse platform 120 may function as a social media platform in which a user's avatar and posts can be represented by non-fungible tokens. For example, upon posting an image or video to metaverse platform 120, metaverse platform 120 may mint a non-fungible token to tokenize the image or video. In this manner, metaverse platform 120 can provide users with the ability to protect and market their digital content through non-fungible tokens.

Non-fungible token marketplaces 108 may be representative of one or more online marketplaces in which a user can upload or link their metaverse digital content. Via non-fungible token marketplaces 108 a user can buy, sell, or showcase their tokenized items of digital content. In some embodiments, non-fungible token marketplaces 108 may include centralized marketplaces (e.g., OpenSea) and/or decentralized marketplaces (e.g., LOOKSRARE). In some embodiments, any post within metaverse platform 120 that is also linked to a non-fungible token marketplace 108 may include a uniform resource locator or link that links back to the original post in metaverse platform 120.

Networked computers 106 may be configured to host blockchain 122. In some embodiments, blockchain 122 may be a public blockchain. In some embodiments, blockchain 122 may be a private blockchain, such as, for example, a private blockchain associated with server system 104. Generally, blockchain 122 may be representative of any blockchain configured to support non-fungible tokens. For example, blockchain 122 may be a public or private blockchain based on the Ethereum platform.

Figure 2:
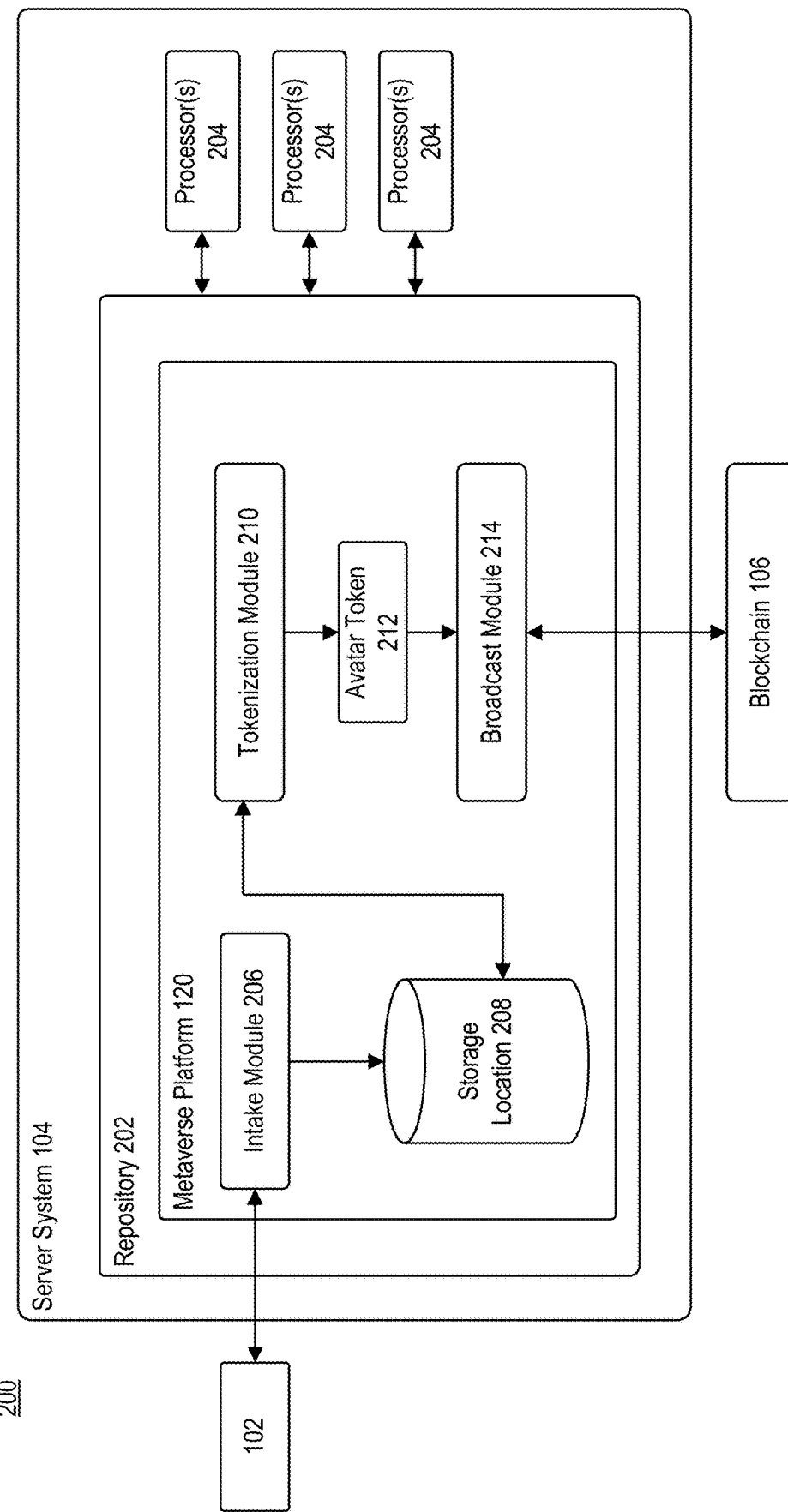
FIG. 2 is a block diagram illustrating server system of FIG. 1, according to example embodiments.

FIG. 2 is a block diagram 200 illustrating server system 104, according to example embodiments. As shown, server system 104 includes repository 202 and one or more computer processors 204.

Repository 202 may be representative of any type of storage unit and/or device (e.g., a file system, database, collection of tables, or any other storage mechanism) for storing data. Further, repository 202 may include multiple different storage units and/or devices. The multiple different storage units and/or devices may or may not be of the same type or located at the same physical site. As shown, repository 202 includes at least metaverse platform 120.

Metaverse platform 120 may include an intake module 206, a tokenization module 210, and a broadcast module 214. While metaverse platform 120 may include more modules, the present discussion focuses on an initial avatar generation process. Each of intake module 206, tokenization module 210, and broadcast module 214 may be comprised of one or more software modules. The one or more software modules are collections of code or instructions stored on a media (e.g., memory of server system 104) that represent a series of machine instructions (e.g., program code) that implements one or more algorithmic steps. Such machine instructions may be the actual computer code the processor of server system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

As shown, a user device 102 may upload or provide metaverse platform 120 with an avatar image indicative of an avatar of the user. In some embodiments, the avatar image may be used to uniquely identify the user within the metaverse hosted by metaverse platform 120.

Intake module 206 may be configured to receive the avatar image and metadata information from user device 102. Upon receiving the avatar image of the user's avatar, intake module 206 may store the image at a network accessible location. For example, intake module 206 may store the avatar image storage location 208. Although storage location 208 is shown internal to metaverse platform 120, those skilled in the art understand that storage location 208 may represent an external file hosting server or service. In some embodiments, storage location 208 may be controlled by an entity associated with server system 104. In some embodiments, storage location 208 may be an external service, such as, but not limited to, InterPlanetary File System (IPFS). Upon storing the image in storage location 208, intake module 206 may generate or receive a unique uniform resource identifier (URI) indicating the storage location of the avatar image. Intake module 20 may provide the URI of the image to the user of user device 102. The user may use the URI of the avatar image to generate a metadata file corresponding to the avatar image.

In some embodiments, the user may upload a metadata file corresponding to the avatar image. The metadata file may define the traits for the avatar image. Exemplary traits may include, but are not limited to, base traits, a tech pack, regional traits (e.g., tech lines, clip accents, main region, etc.), eyes, teeth, headwear, ears, and the like. Through the combination of traits, there may be more than a quadrillion combinations of traits. Accordingly, there may be more than a quadrillion unique avatars within the metaverse environment. In some embodiments, the metadata file may be representative of, for example, a JSON file, to which the eventual non-fungible token will be linked. The metadata file may include, for example, the URI that identifies storage location 208 of the avatar image. Intake module 206 may further store the metadata file corresponding to the avatar image in storage location 208.

Tokenization module 210 may be configured to tokenize the avatar image provided by the user. For example, tokenization module 210 may be configured to generate a smart contract based on the avatar image. In some embodiments, the smart contract may be representative of an ERC721 token. The smart contract may include, for example, a URI corresponding to token 212, the URI that identifies a storage location of the avatar image in storage location 208, and the URI that identifies a storage location of the metadata file corresponding to the avatar image.

Broadcast module 214 may be configured to broadcast or write token 212 to blockchain 122. In some embodiments, broadcast module 214 may directly write token 212 to blockchain 122. For example, in some embodiments, broadcast module 214 may deploy token 212 on Ethereum Mainnet. Once deployed, token 212 may be bridged off Ethereum Mainnet to cheaper layer-2 blockchains (L2) like Polygon. Such bridging may make it easier for users to interact directly from an L2.

As those skilled in the art understand, to mint the user's avatar, a user may have to pay the gas fee associated with the minting process. The gas fee may provide miners with an incentive to process and validate transactions on blockchain 122.

Once the avatar image is minted, token 212 may be provided back to user device 102 for storage in the user's wallet 116. In some embodiments, token 212 may be temporarily held or controlled by an entity associated with server system 104. For example, token 212 may initially be deployed from and owned by the entity, thus allowing a development team to retain control until token 212 is transferred from a wallet associated with server system 104 (e.g., Gnosis Multisig) to a wallet 116 of the user.

Although the above discussion focuses on an avatar being minted as a token 212, those skilled in the art understand that such avatars need not be minted as a token.

In some embodiments, rather than allowing an end user (e.g., user) to create their own digital avatars, the above process may be instead performed by an administrator of server system 104. For example, an administrator may generate an initial plurality of avatars by randomly selecting combinations of traits. Such initial plurality of avatars may be made available to end users through an auction process. For example, server system 104 may use a traditional Dutch auction process, in which avatars may be rewarded to end users. In such embodiments, server system 104 may initially generate a convertible token using the ERC1155 standard. Once an end user is rewarded with an avatar through the auction process, the end user may be instructed to "burn" the ERC1155 token, which would then exchange the convertible token from the ERC1155 token to the ERC721 token.

In some embodiments, metaverse platform 120 may support replacement of users with their avatar equivalent in real-time during the content creation process or after the original posting of the generated content. For example, if Bob is a user of metaverse platform 120 and has an associated avatar, metaverse platform 120 may support facial recognition processes that identifies Bob in social media content posted to metaverse platform 120 and replaces the photo of Bob with their associated avatar.

Figure 3:
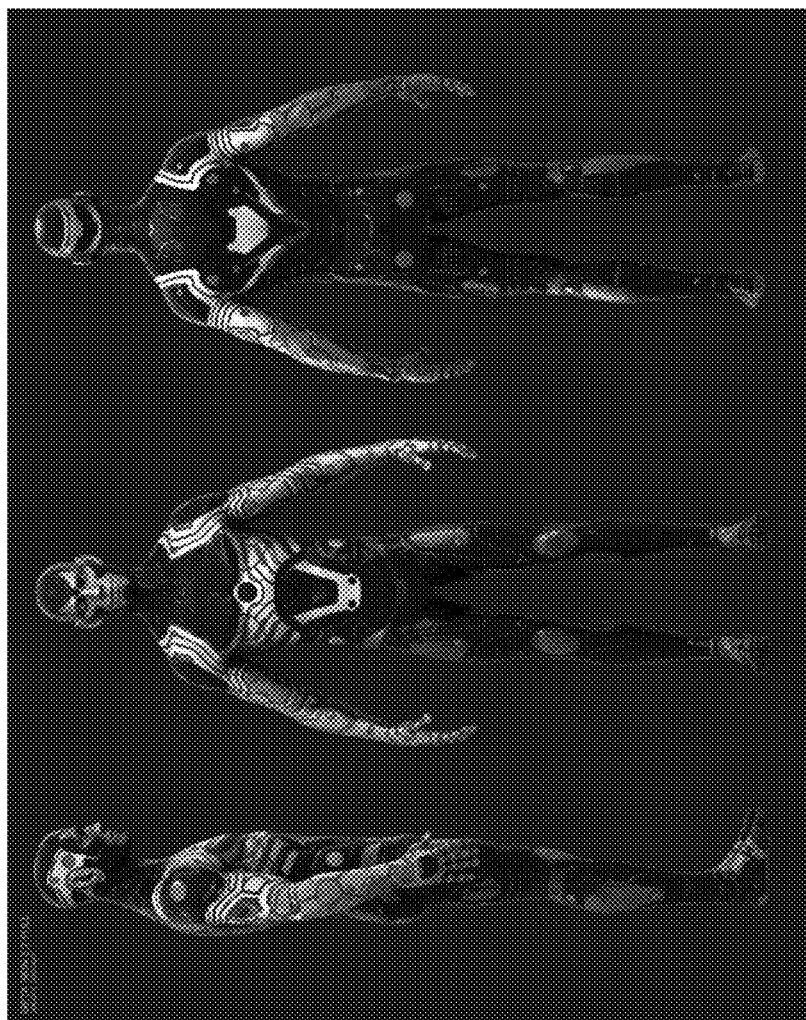
FIG. 3 illustrates an exemplary avatar, according to example embodiments.

FIG. 3 illustrates an exemplary avatar 300, according to example embodiments. As shown, avatar 300 may be representative of an avatar that is uniquely associated with a user or user account. Avatar 300 may be representative of a base character without any accessories. As shown, the appearance of avatar 300 may be dependent on the metadata defined by the user. For example, a user may define, in the metadata file associated with avatar 300, certain metadata categories that influence the appearance of avatar 300.

Avatar 300 may include a plurality of customizable regions. For example, a user may be able to customize one or more of: the base body, base face, base skin tone, a plurality of regions where various textures and colors can be applied, eyes, ears, and the like. Each region of the plurality of regions may include different textures and/or colors. Each region may have an associated metadata column, in which that region's textures and colors can be defined. In some embodiments, the metadata file associated with avatar 300 may further include a special illumination field. The special illumination field may be used for rare traits. For example, the special illumination field can allow for rare traits, such as tech lines lighting up. As those skilled in the art understand, such avatar 300 may be used outside of a metaverse environment, such as in different metaverse environments or non-metaverse environments. For example, a user can user their avatar 300 on other platforms, such as, but not limited to, a video game environment (e.g., a custom character in a game), a streaming service, and the like. For example, a user may use their avatar 300 as a drop-in replacement for themselves in a video conference, stream, live render, etc. In this manner, any video generated through the video conference, stream, or live render, using avatar 300, may itself be minted as a token.

In some embodiments, there may be multiple displays of avatar 300. For example, a user may record and stream a live feed of themselves, while they are being converted to their avatar 300 in real-time or near real-time. For example, a user may be playing on stage, while being projected as an MTSkin in all surrounding displays. Simultaneously, the output of the MTskin may be streamed to be the performer on stage in a metaverse environment. Thus, all surrounding displays in the metaverse would show a feed of the physical performer.

In operation, when a user accesses their avatar (e.g., avatar 300) via application 112, application 112 may extract metadata information for the avatar from cryptographic wallet 116. As such, application 112 may render the user's avatar locally on user device 102 by reconstruction the user's avatar using the base avatar character and the defined traits for the avatar, as stored in cryptographic wallet 116.

Figure 4:
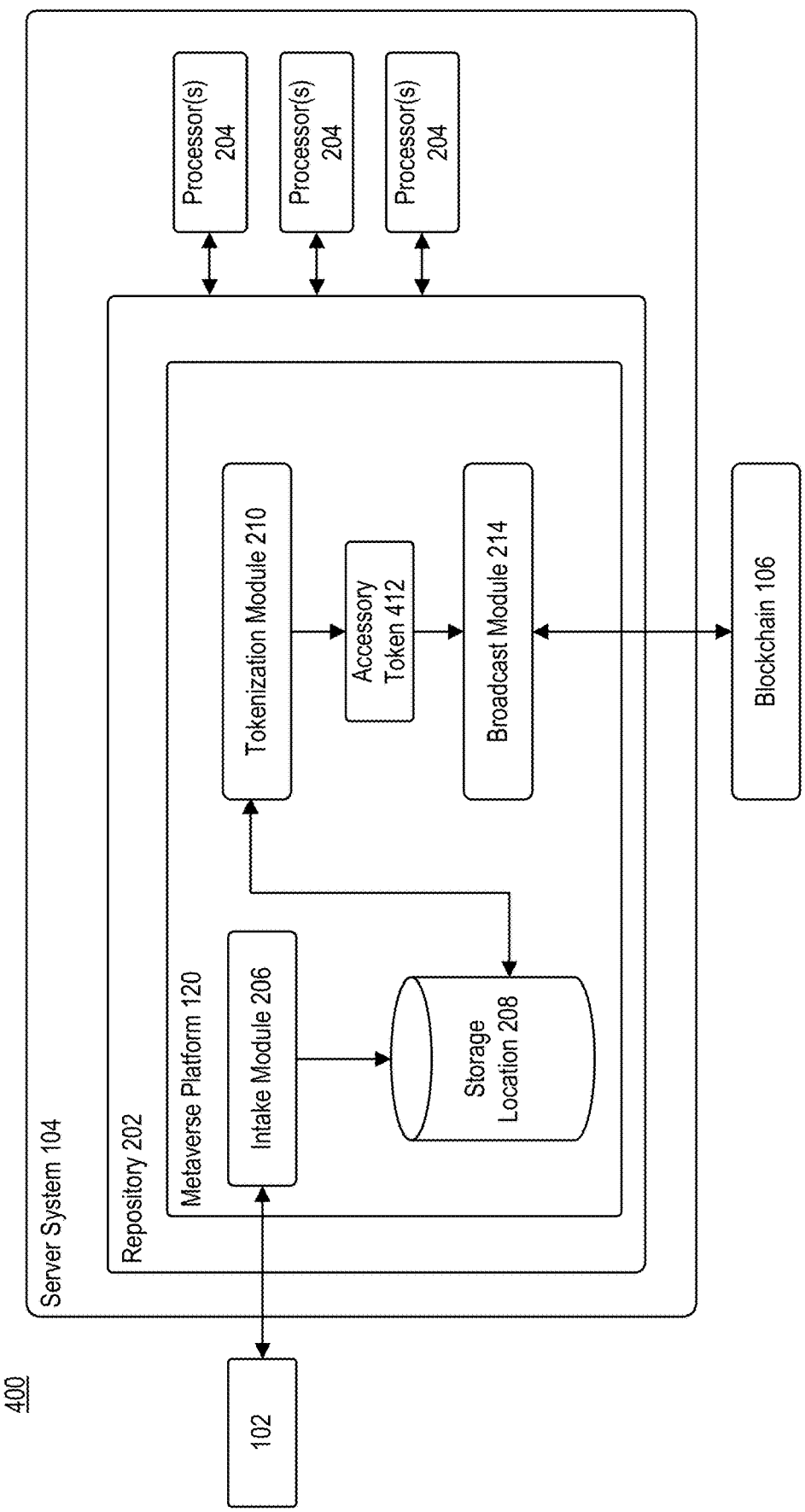
FIG. 4 is a block diagram illustrating server system of FIG. 1, according to example embodiments.

FIG. 4 is a block diagram 400 illustrating server system 104, according to example embodiments. As shown, block diagram 400 may illustrate components of server system 104 involved in the minting of accessories for the user's avatar.

As shown, a user device 102 may upload or provide metaverse platform 120 with an accessory image indicative of an accessory for user with the user's avatar. Exemplary accessories may be, for example, hats, shirts, watches, wallets, bags, swords, basketballs, etc. The accessories may be used to customize or change the appearance of the user's avatar in digital content.

Intake module 206 may be configured to receive the accessory image and metadata information from user device 102. Upon receiving the accessory image, intake module 206 may store the image at a network accessible location. For example, intake module 206 may store the accessory image at storage location 208. Upon storing the image in storage location 208, intake module 206 may generate or receive a unique uniform resource identifier (URL) indicating the storage location of the accessory image. Intake module 206 may provide the URL of the accessory image to the user of user device 102. The user may use the URL of the accessory image to generate a metadata file corresponding to the accessory image.

In some embodiments, the user may upload a metadata file corresponding to the accessory image. The metadata file may define the traits for the accessory image. In some embodiments, the metadata file may be representative of a JSON file to which the eventual non-fungible token will be linked. The metadata file may include, for example, the URL that identifies storage location 208 of the accessory image. Intake module 206 may further store the metadata file corresponding to the accessory image in storage location 208.

Tokenization module 210 may be configured to tokenize the accessory image provided by the user. For example, tokenization module 210 may be configured to generate a smart contract based on the accessory image. In some embodiments, the smart contract may be representative of an ERC1155 token. Tokenization module 210 may utilize an ERC1155 token in order to make the accessories tradable and handle the semi-fungibility of accessories. Separate ERC1155 tokens for each accessory may allow for new accessories to be released to match the needs of that specific accessory's launch but can still interact with the existing posts. The smart contract may include, for example, a URI corresponding to token 412, the URL that identifies a storage location of the accessory image in storage location 208, and the URL that identifies a storage location of the metadata file corresponding to the accessory image.

Broadcast module 214 may be configured to broadcast or write token 412 to blockchain 122. In some embodiments, broadcast module 214 may directly write token 412 to blockchain 122. For example, in some embodiments, broadcast module 214 may deploy token 412 on Ethereum Mainnet. Once deployed, token 412 may be bridged off Ethereum Mainnet to cheaper L2s.

As those skilled in the art understand, to mint the accessory, a user may have to pay the gas fee associated with the minting process. The gas fee may provide miners with an incentive to process and validate transactions on blockchain 122.

Once the accessory image is minted, token 412 may be provided back to user device 102 for storage in the user's wallet 116. In some embodiments, token 412 may be temporarily held or controlled by an entity associated with server system 104. For example, token 412 may initially be deployed from and owned by the entity, thus allowing a development team to retain control until token 412 is transferred from a wallet associated with server system 104 (e.g., Gnosis Multisig) to a wallet 116 of the user.

Figure 5:
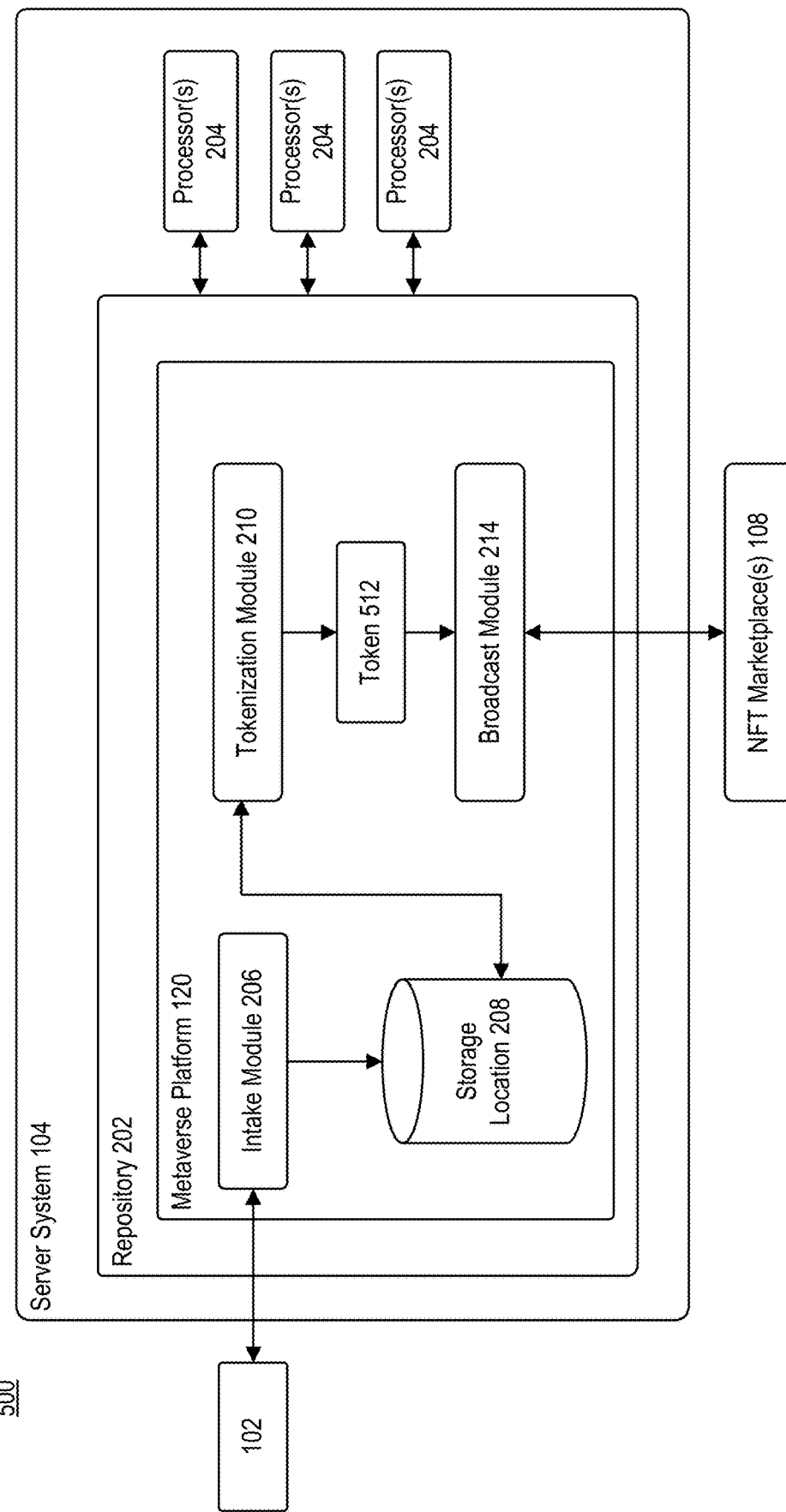
FIG. 5 is a block diagram illustrating server system of FIG. 1, according to example embodiments.

FIG. 5 is a block diagram 500 illustrating server system 104, according to example embodiments. As shown, block diagram 500 may illustrate components of server system 104 involved in the minting of digital content.

As shown, a user device 102 may upload or provide metaverse platform 120 with digital content. In some embodiments, the digital content may be representative of image content and/or video content generated by the user using user device 102. For example, a user may generate digital content using AR software 114. By using AR software 114, the user can insert the user's tokenized avatar into audio and/or video content.

Intake module 206 may be configured to receive the digital content and metadata information corresponding to the digital content from user device 102. Upon receiving the digital content, intake module 206 may store the digital content at a network accessible location. For example, intake module 206 may store the content in storage location 208. Upon storing the digital content in storage location 208, intake module 206 may generate or receive a URL indicating the storage location of the digital content. Intake module 206 may provide the URL of the digital content to the user of user device 102. The user may use the URL of the digital content to generate a metadata file corresponding to the digital content.

In some embodiments, the user may upload a metadata file corresponding to the digital content to intake module 206. The metadata file may define the traits for the digital content. Exemplary traits may include, but are not limited to, base traits, a tech pack, regional traits (e.g., tech lines, clip accents, main region, etc.), eyes, teeth, headwear, ears, and the like. In some embodiments, the metadata file may be representative of a JSON file to which the eventual non-fungible token will be linked. The metadata file may include, for example, the URI that identifies storage location 208 of the digital content. Intake module 206 may further store the metadata file corresponding to the digital content in storage location 208.

As indicated above, the digital content produced by the user includes the user's avatar token. In order to link the user's avatar token with the digital content, the metadata file may further include the URI corresponding to the tokenized avatar.

In some embodiments, the digital content produced by the user may further include an accessory token made available from server system 104 and/or generated by the user. In order to link the accessory token with the digital content, the metadata file may further include the URI corresponding to the tokenized accessory.

Tokenization module 210 may be configured to tokenize the digital content provided by the user (i.e., token 512). For example, tokenization module 210 may be configured to generate a smart contract based on the digital content and the avatar image. In some embodiments, the smart contract may further be based on any indicated accessories. In some embodiments, the smart contract may be representative of an ERC721 token. In some embodiments, the smart contract may be representative of an ERC1155 token. The smart contract may include, for example, a URI corresponding to token 512, the URL that identifies a storage location of the digital content in storage location 208, and the URL that identifies a storage location of the metadata file corresponding to the digital content. In some embodiments, the smart contract may further include a URI corresponding to token 212, the URL that identifies a storage location of the avatar image in storage location 208, and the URL that identifies a storage location of the metadata file corresponding to the avatar image. In some embodiments, the smart contract may further include a URI corresponding to token 412, the URL that identifies a storage location of the accessory image in storage location 208, and the URL that identifies a storage location of the metadata file corresponding to the accessory image.

As those skilled in the art recognize, when a user mints a non-fungible token, the user typically has to pay a gas fee for the minting process to incentive miners to process and validate transaction on blockchain 122. The gas fee may disincentivize users from generating posts within the metaverse environment. Accordingly, to incentivize users to generate content within the metaverse environment, content posts may undergo a "gasless mint." In a gasless mint, tokenization module 210 may generate the ERC721 or ERC 1155 token corresponding to the digital content; however, broadcast module 214 may not broadcast or write token 512 to blockchain 122 until another user interacts with the digital content. For example, if another user buys the digital content, such action may trigger the writing of token 512 to blockchain 122. In other words, token 512 may not be broadcast or written to blockchain 122 until another user buys token 512. In this manner, the burden of paying the gas fee may be transferred from the user to the buyer of the digital content.

Accordingly, once token 512 is generated, token 512 may be stored in storage location 208. Broadcast module 214 may be configured to broadcast or post the digital content to the user's account within the metaverse environment and/or one or more external non-fungible token marketplaces 108 (e.g., OpenSea).

As those skilled in the art understand, in some embodiments, the gasless minting process can be replaced with a direct minting process, whereby the digital content is instantly minted to blockchain 122 and the associated gas fee is paid by the user.

In some embodiments, token 512 may be owned my multiple users. For example, shares of token 512 may be fractionalized, such that token 512 may have a plurality of owners. For example, user 1 owns a 30% share, user 2 owns a 50% share, and user 3 owns a 20% share. In this manner, any revenue garnered from token 512 (e.g., through interactions or engagements) may be distributed among the shareholders of token 512. In this manner, tokenized social media content may be fractionalized, such that ownership of the tokenized social content may be shared among multiple owners.

In some embodiments, once a post is generated, a user may tag that post with a location. For example, a user's post may be taken at City Hall and the user may tag City Hall as the location for the post. In this manner, when another user accesses metaverse environment 124 via user device 103, the user may view the post within metaverse environment

124 when approaching City Hall. For example, when digital content is minted and tagged with a geolocation, other users may access an interactive map that details the location of the digital content within the metaverse environment. If, for example, a user accesses metaverse environment using an extended reality device, the user may be able to see the post in the physical world by using the extended reality software. Accordingly, when the user is near City Hall in the physical world, the post may be visible to the user via the extended reality software.

In some embodiments, once a post is generated, a user viewing that post may choose to view it in their physical space. For example, a user may generate a post of their avatar dancing in a park, the user viewing the generated post can select to view the avatar, using the extended reality software, dancing on the coffee table of their living room.

In some embodiments, any of tokens 212, 412, or 512 may be a "parent" token or a "child" token. For example, a parent token may have, stemming off of it, one or more child tokens.

Using a more specific example, an ownership token (e.g., a parent token) can be stored a more secure form of storage (e.g., cold storage), while the child token associated with the parent token can be connected, for example, to a social media platform (e.g., Twitter) as a profile picture, used for utilizing or playing as your avatar in a video game, or lent as part of a licensing deal to be used in social media, games, etc. Such processes can be performed without ever having to send the parent token. In some embodiments, the child token can be tied to the parent token on the same blockchain or even another blockchain. In this manner, there are far fewer risks associated going cross platform and cross chain since the child can be recalled. In some embodiments, the tokenized data can further be anonymized by utilizing, for example, a zero knowledge proof (or zero knowledge rollup) to create an encrypted layer between the parent token and child token for privacy purposes.

In some embodiments, a token may be a "child" token. For example, the token may be tethered to another parent token. In some embodiments, a child token may not be transferrable on its own without the parent token. In some embodiments, a child token may be transferrable on its own without the parent token. If a user owns a parent token, the user can claim the child token regardless of whether another person holds it. Such functionality may provide users with another set of security. For example, the user's parent token can be stored in a more secure vault (e.g., cold storage) while a child token tethered to the parent token remains in a hot storage wallet.

In some embodiments, such parent/child relationship may be utilized to create personalized advertisements that may directed to the consumer but prevent that personal information from reaching the advertiser. Such functionality may be a practical way of allowing users to opt into seeing certain advertisements, but with a layer of anonymization, security, and further customization of targeted advertisements the user is being served, such as by wallet address.

In some embodiments, a user may be able to lease or loan out their avatars or accessories. For example, as discussed above, an avatar token 212 or accessory token 412 may be representative of a parent token that includes a plurality of child tokens. The user (i.e., lessor) may facilitate a smart contract with another user (e.g., a lessee) that allows the lessee to temporarily use the user's avatar or accessory in metaverse environment 124 or outside of metaverse environment 124 (e.g., video game, Web2 environment, etc.).

Figure 17:
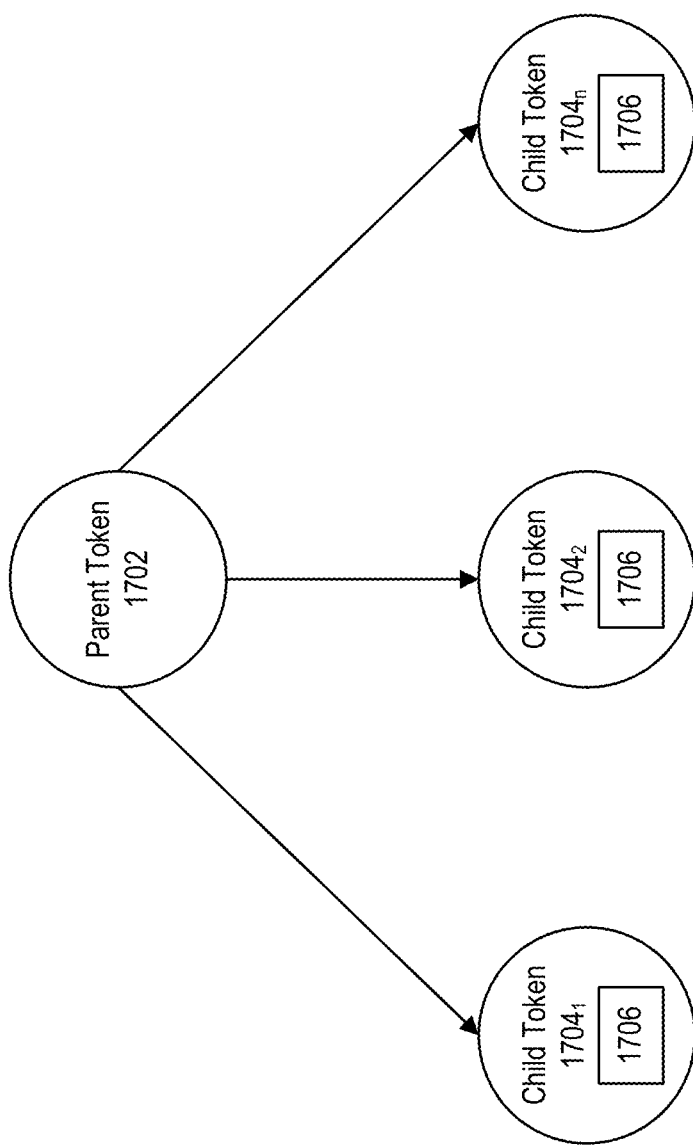
FIG. 17 illustrates an example diagram of a parent-child token relationship, according to example embodiments.

FIG. 17 illustrates an example diagram of a parent-child token relationship, according to example embodiments. As shown, there is a parent token 1702. Parent token 1702 may include n child tokens associated therewith (token $1704_1$, $1704_2$, ..., $1704_n$) (generally child token 1704). Each child token 1704 may be leased out or loaned out to another user. For example, each child token 1704 may have corresponding metadata 1706 associated therewith. Metadata 1706 may define the terms of the lease agreement between lessor and lessee.

In some embodiments, rather than utilize a parent/child token relationship, a user may be able to lease or loan out their avatars using another user as a temporary custodian of avatar token 212 or accessory token 412. For example, if a parent token is licensed to be used in marketing material, the smart contract could restrict the movement of either token until the term or certain conditions are met.

In some embodiments, metaverse platform 120 may be configured to take any metadata that may be integrated in a database associated with metaverse platform 120 and may reproduce that asset or metadata inside metaverse platform 120. Through the rendering of metadata, users may have the ability to choose which assets may be represented in the media output. Such functionality may provide users with the ability to choose any asset they own or have access to and, in real-time, have that asset render inside a three-dimensional environment, such as a metaverse environment. Once the asset is rendered, metaverse platform 120 may pull skeletal data of the user in a frame and animate the chosen avatar in real-time or near real-time.

Figure 6A:
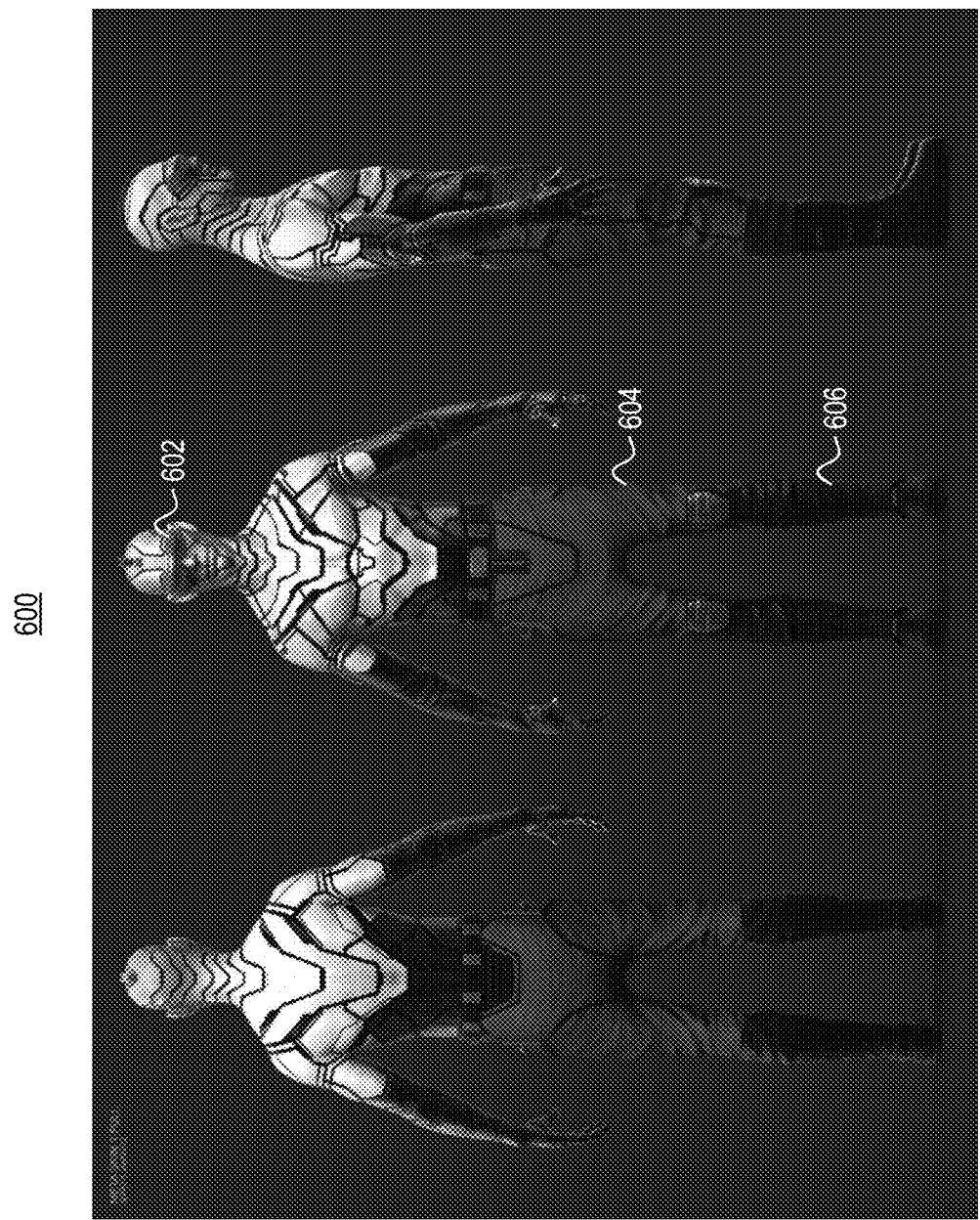
FIG. 6A illustrates an exemplary avatar with accessories, according to example embodiments.

FIG. 6A illustrates an exemplary avatar 600 with accessory 602, accessory 604, and accessory 606, according to example embodiments. As shown avatar 600 may be based on base character avatar 300 discussed above in conjunction with FIG. 3.

Avatar 600 may include a plurality of accessories 602-606 associated therewith. As shown, avatar 600 may include accessory 602 corresponding to a glasses accessory, accessory 604 corresponding to a pants accessory, and accessory 606 correspond to a boots accessory. Each of accessory 602-606 may be represented as its own respective accessory token. Such accessories 602-606 may be rendered on the base avatar. For example, such accessories 602-606 may be rendered on the base avatar, locally, on user device 102.

Figure 6B:
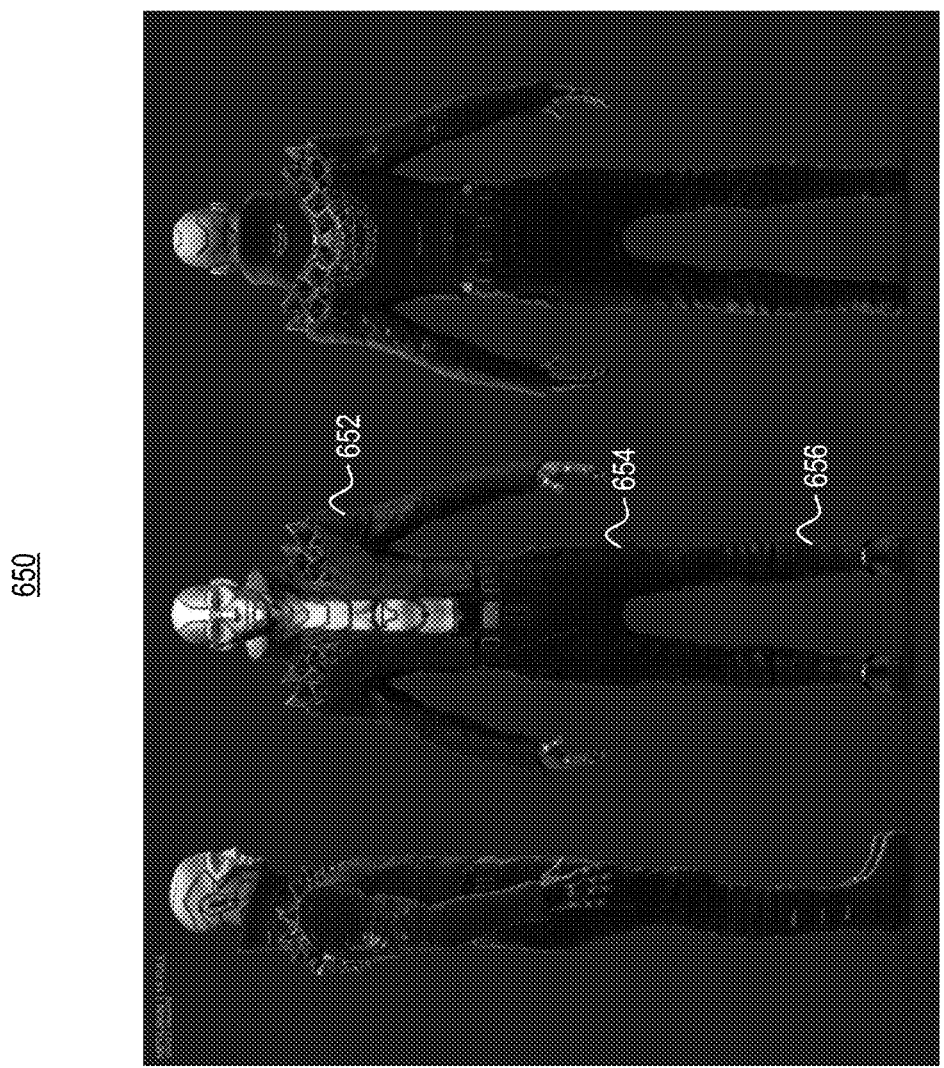
FIG. 6B illustrates an exemplary avatar with accessories, according to example embodiments.

FIG. 6B illustrates an exemplary avatar 650 with accessory 652, accessory 654, and accessory 656, according to example embodiments. As shown avatar 650 may be based on base character avatar 300 discussed above in conjunction with FIG. 3.

Avatar 650 may include a plurality of accessories 652-656 associated therewith. As shown, avatar 650 may include accessory 652 corresponding to a jacket accessory, accessory 654 corresponding to a pants accessory, and accessory 656 correspond to a boots accessory. Each of accessory 652-656 may be represented as its own respective accessory token. Such accessories 652-656 may be rendered on the base avatar. For example, such accessories 652-656 may be rendered on the base avatar, locally, on user device 102.

Similar to the above, as those skilled in the art understand, such avatars 600 and 650 may be used outside of a metaverse environment. For example, a user can user their avatar 600 or 650 on other platforms, such as, but not limited to, a video game environment (e.g., a custom character in a game).

FIG. 7 is a block diagram 700 illustrating server system 104, according to example embodiments. As shown, block diagram 700 may illustrate components of server system 104 involved in monitoring digital content for a trigger event.

Monitoring module 704 may be configured to monitor a user's digital content to determine when a trigger event 702 occurs. As provided above, a trigger event may be associated with a buying, selling, or transferring of token 512 corresponding to the digital content. In some embodiments, monitoring module 704 may be configured to monitor the user's digital content within the metaverse environment. In some embodiments, monitoring module 704 may be configured to monitor the user's digital content in one or more non-fungible token marketplaces 108.

Responsive to identifying event 702, monitoring module 704 may retrieve the corresponding token 512 from storage location 208. Broadcast module 214 may then be configured to broadcast or write token 512 to blockchain 122. In some embodiments, broadcast module 214 may directly write token 512 to blockchain 122. For example, in some embodiments, broadcast module 214 may deploy token 512 on Ethereum Mainnet. Once deployed, token 512 may be bridged off Ethereum Mainnet to cheaper L2s. Such bridging may make it easier for users to interact directly from an L2.

Once the avatar image is minted, token 512 may be provided back to user device 102 for storage in the user's wallet 116. In some embodiments, token 512 may be temporarily held or controlled by an entity associated with server system 104. For example, token 512 may initially be deployed from and owned by the entity, thus allowing a development team to retain control until token 512 is transferred from a wallet associated with server system 104 (e.g., Gnosis Multisig) to a wallet 116 of the user. Once stored in the user's wallet 116, the user can transfer token 512 to the buyer.

Monitoring module 704 may further be configured to monitor a user's content to determine when to reward the user with additional points. As referenced above, the user's content may be displayed on the user's profile within metaverse environment 124 and/or one or more non-fungible token marketplaces 108. Other users may interact with the user's content. Certain activities or interactions can be rewarded with a higher score, ad points, and/or metaverse tokens. Engagements such as likes, shares, views/plays, and comments can create a financial incentive for the user to create content.

In some embodiments, engagements with the user's content may be represented on the blockchain. For example, interactions with social content, such as, but not limited to, likes, shares, and views may be represented on the blockchain.

In some embodiments, interactions with social content may be represented on the blockchain by attaching a transaction to those interactions. In some embodiments, a system where interactions are ported to the blockchain automatically or manually on a preset basis may be used. In some embodiments, the interactions may be ported in a bulk transaction, with all interactions that have happened within computing environment 100 over the past period. In some embodiments, the interactions may be tokenized in real-time or near real-time. Within this structure, the gas fees associated with the transaction representations on the blockchain could be pushed to an entity associated with server system 104 or to the users. In some embodiments, there may be a threshold for how many interactions should occur for a transaction to be triggered.

In some embodiments, monitoring module 704 may update the metadata associated with the user's content to reflect updated scores. For example, as recited above, the metadata file may include various attributes associated with the token to which the metadata is linked. In some embodiments, part of the attributes may include the score for the digital content. Monitoring module 704 may update the metadata file in storage location 208 without affecting the linked token.

Figure 8:
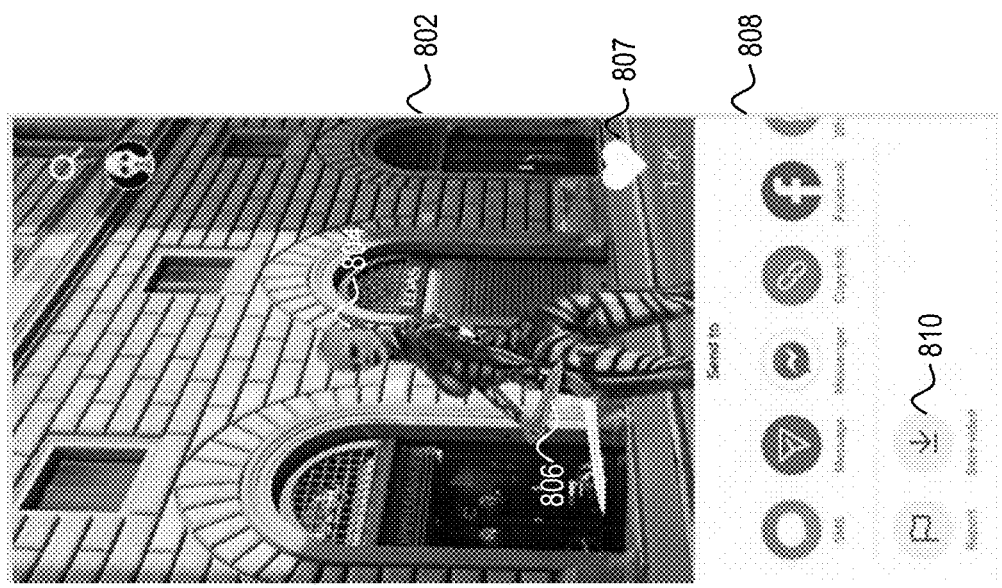
FIG. 8 illustrates an exemplary graphical user interface, according to example embodiments.

FIG. 8 illustrates an exemplary graphical user interface (GUI) 800, according to example embodiments. GUI 800 may include digital content 802. As shown, digital content 802 may include the user's avatar 804 with accessory 806. Accessory 806 may be representative of a sword that is rendered with avatar 804.

Via GUI 800, other users may perform one or more actions that may provide the user with a higher score for their post. For example, a user can like or love digital content 802 via graphical element 807 or share the user's post via panel 808. As shown in panel 808, a user may share digital content 802 to a variety of sources that include, but are not limited to, other individuals via text message, other users within metaverse environment 124, Facebook messenger, Facebook, WhatsApp, and the like. Additionally, in some embodiments, users may be able to save digital content 802 via graphical element 810.

FIG. 9A is a block diagram illustrating server system 104, according to example embodiments. As shown, block diagram may illustrate components of server system 104 involved in indexing events occurring within metaverse environment 124, according to example embodiments.

As shown, monitoring module 704 may be configured to monitor a user's digital content 903 in order to index interactions 901 associated with digital content 903. Example interactions with digital content 903 may include, but are not limited to, liking, commenting, sharing, etc. the user's digital content. In some embodiments, monitoring module 704 may be configured to record each interaction 901 in association with a token 512 corresponding to the digital content. In some embodiments, recording each interaction 901 in association with a token corresponding to digital content 903 may include monitoring module 704 updating a metadata file 902 associated with token 512. For example, monitoring module 704 may update metadata file 902 stored in storage location 208.

In some embodiments, monitoring module 704 may perform such indexing in real-time or near real-time on an interaction-by-interaction basis. In some embodiments, monitoring module 704 may perform batch processing of multiple interactions periodically throughout the day.

Such indexing may be useful, for example, when transferring ownership of token 512 between users. For example, assume that token 512 corresponds to a social media post that includes a thousand likes and a hundred comments. When an owner of token 512 transfers ownership of token 512 to a buyer, indexing of interactions may allow for the transfer of the interactions with token 512. Thus, all likes, comments, or other interactions stored in association with token 512 may be transferred to the buyer.

Figure 9B:
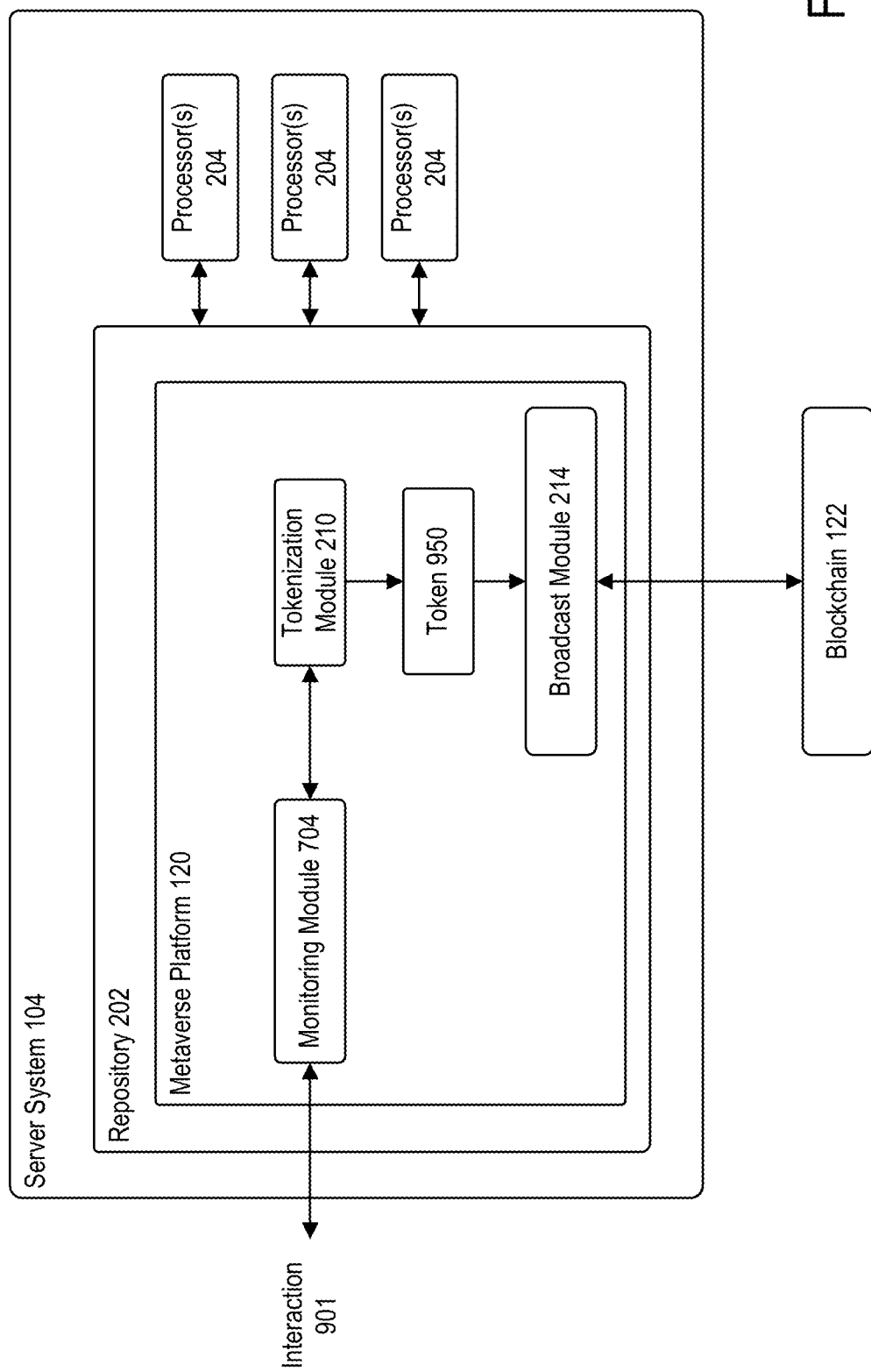
FIG. 9B is a block diagram illustrating server system, according to example embodiments.

FIG. 9B is a block diagram illustrating server system 104, according to example embodiments. As shown, block diagram may illustrate components of server system 104 involved in indexing events occurring within metaverse environment 124, according to example embodiments.

As shown, monitoring module 704 may be configured to monitor a user's digital content 903 in order to index interactions 901 associated with digital content 903. Example interactions with digital content 903 may include, but are not limited to, liking, commenting, sharing, etc. the user's digital content. In some embodiments, monitoring module 704 may be configured to record each interaction 901 in association with a token 512 corresponding to the digital content. In some embodiments, recording each interaction 901 in association with a token corresponding to digital content 903 may tokenization module 210 generating a token 950 or immutable record corresponding to each interaction 901. Broadcast module 214 may broadcast token 950 to blockchain 122. In some embodiments, broadcast module 214 may create a link between token 512 and token 950.

Figure 10A:
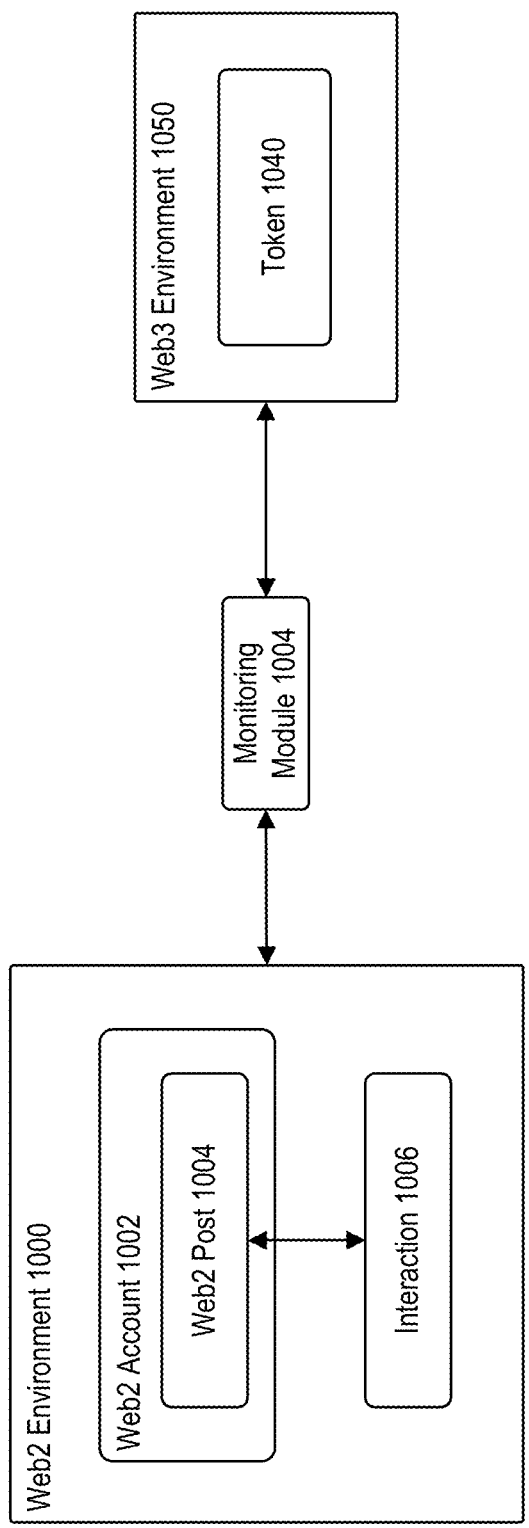
FIG. 10A is a block diagram illustrating interaction between a Web2 environment and a Web3 environment, according to example embodiments.

FIG. 10A is a block diagram illustrating interaction between a Web2 environment 1000 and a Web3 environment 1050, according to example embodiments. As shown, monitoring module 704 may sit logically between Web2 environment 1000 and Web3 environment 1050.

As discussed above, metaverse platform 120 may be configured to host metaverse environment 124 in which a user may generate social media posts and in which other users may interact with (e.g., comment, like, etc.) the generated social media posts. As those skilled in the art understand, a user of the metaverse environment may link their metaverse account (e.g., Web3 account) with their associated non-metaverse accounts (e.g., Web2 accounts). Example Web2 accounts may include, but are not limited to, Instagram, Twitter, TikTok, Facebook, SoundCloud, Medium, and the like.

When such linkage occurs, monitoring module 704 may be configured to monitor the user's Web2 accounts (e.g., Web2 Account 1002), such that monitoring module 704 may port over the user's Web2 posts and/or interactions. For example, upon a user linking their Instagram account with their metaverse account, monitoring module 704 may be configured to index and port over the user's Instagram posts. Using a more specific example, assume that a user has a post (e.g., Web2 post 1004) in Instagram. Monitoring module 704 may identify Web2 post 1004 and all of Web2 post's 1004 interactions 1006 (e.g., likes, comments, shares). Monitoring module 704 may cause metaverse platform 120 to generate a token 1040 corresponding to the user's Instagram post, as discussed above in conjunction with FIG. 7. Similar to the process discussed above, monitoring module 704 may store a representation of the user's Instagram post in storage location 208. Monitoring module 704 may then generate a token 1040 based on the user's Instagram post. Such token 1040 may thus exist as a social media post in metaverse environment 124.

In some embodiments, monitoring module 704 may further index each interaction 1006 associated with the Instagram post. For example, monitoring module 704 may be configured to identify and save each interaction 1006 in association with token 1040. In some embodiments, such process may include monitoring module 704 updating a metadata file associated with token 1040 (e.g., stored in storage location 208) to include each interaction. In such embodiments, monitoring module 704 may effectively port over Web2 post's 1004 interactions 1006 from Web2 environment 1000 to Web3 environment 1050.

In some embodiments, monitoring module 704 may be further configured to continually or periodically monitor Web2 post 1004 to continue the indexing process. For example, monitoring module 704 may continually or periodically Web2 post 1004 to update token's 1040 metadata file with new interactions. In this manner, any interaction with Web2 post 1004 may be indexed in storage location 208 such that the user may be credited with those interactions in the Web3 version of the social media post.

Figure 10B:
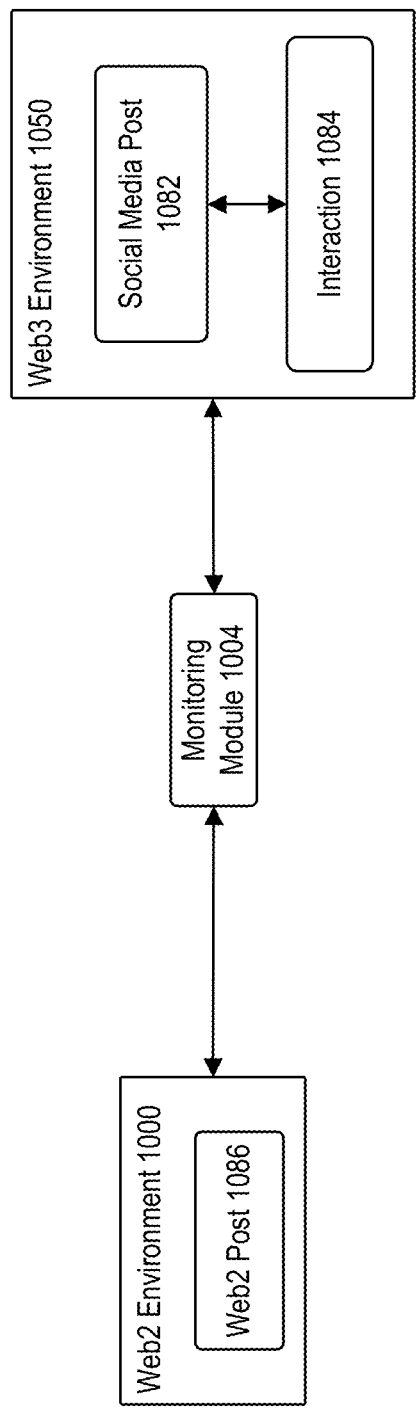
FIG. 10B is a block diagram illustrating interaction between a Web2 environment and a Web3 environment, according to example embodiments.

FIG. 10B is a block diagram illustrating interaction between a Web2 environment 1000 and a Web3 environment 1050, according to example embodiments. Similar to the process discussed above in conjunction with FIG. 10A, monitoring module 704 may further be configured to monitor a user's Web3 posts, such that monitoring module 704 may index and port over the user's Web3 posts and/or interactions into Web2 environment 1000. For example, as shown, a user may create a social media post 1082 in Web3 environment 1050. As discussed above in conjunction with FIGS. 2, metaverse platform 120 may generate a token (e.g., token 512) associated with social media post 1082. Similarly, as discussed above in conjunction with FIG. 7, monitoring module 704 may monitor social media post 1082 to index interactions 1084 with social media post 1082.

In some embodiments, upon a user linking their Web2 account with their Web3 account, monitoring module 704 may also be configured to port over the user's Web3 posts (e.g., social media post 1082) into Web2 environment 1000. Continuing with the above example, monitoring module 704 may identify social media post 1082 and interactions 1084 (e.g., likes, comments, shares). Monitoring module 704 may generate a Web2 post 1086 corresponding to social media post 1082 and may cause Web2 post 1086 to exist in Web2 environment 1000.

In this manner, monitoring module 704 may facilitate seamless integration between social media posts existing in Web2 environment 1000 and social media posts existing in Web3 environment 1050.

FIG. 11A is a block diagram illustrating a computing environment 1100, according to example embodiments. As shown, computing environment 1100 may include a Web2 environment 1100 and a Web3 environment 1150, according to example embodiments. As shown, monitoring module 704 may sit logically between Web2 environment 1100 and Web3 environment 1150.

Web3 environment 1150 may include a post 1102 generated by a user in metaverse environment 124. In some embodiments, post 1102 may include a Web2 counterpart existing in Web2 environment 1100. As discussed above in conjunction with FIG. 2, when a user goes through the process of tokenizing a social media post, metaverse platform 120 may create a watermark to include in the social media post. As shown, post 1102 may include associated watermark 1104. In this manner, unauthorized uses of the social media post can be tracked. Monitoring module 704 may be configured to scour or scan Web3 environment 1150 and Web2 environment 1100 to identify any posts that include the watermark unique to post 1102. If, for example, monitoring module 704 identifies a re-post 1110 or unauthorized post that includes watermark 1104, monitoring module 704 may attribute any interactions with the re-post or unauthorized post back to post 1102, similar to the indexing process discussed above in conjunction with FIGS. 9A-10B. In some embodiments, monitoring module 704 may notify owner of post 1102 of the re-post or unauthorized use.

Figure 11B:
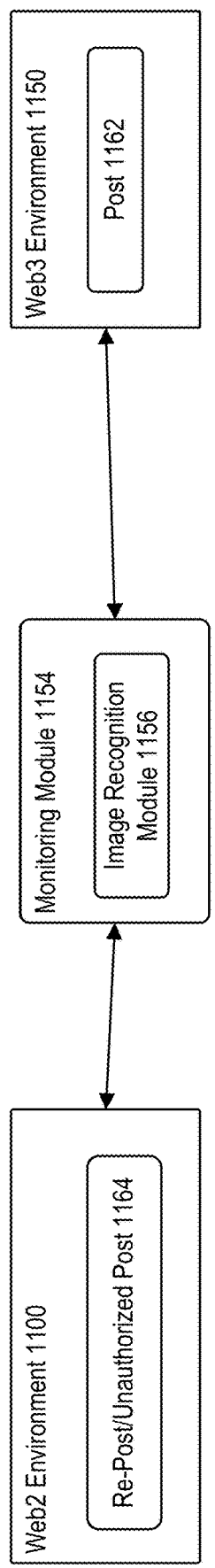
FIG. 11B is a block diagram illustrating a computing environment, according to example embodiments.

FIG. 11B is a block diagram illustrating a computing environment 1100, according to example embodiments. As shown, computing environment 1100 may include a Web2 environment 1100 and a Web3 environment 1150, according to example embodiments. As shown, monitoring module 1154 may sit logically between Web2 environment 1100 and Web3 environment 1150.

Web3 environment 1150 may include a post 1162 generated by a user in metaverse environment 124. In some embodiments, post 1162 may include a Web2 counterpart existing in Web2 environment 1100. Rather than utilize the watermarking approach discussed above in conjunction with FIG. 2 and FIG. 11A, in some embodiments, monitoring module 1154 may include an image recognition module 1156. Image recognition module 1156 may be representative of one or more computer vision or artificial intelligence techniques for identifying reposts or unauthorized posts of post 1162. In this manner, unauthorized uses of the social media post can be tracked using computer vision and/or artificial intelligence technology. For example, monitoring module 1154 may be configured to scour or scan Web3 environment 1150 and Web2 environment 1100 to identify any posts that may be similar to or derivatives of post 1162. If, for example, monitoring module 1154 identifies a re-post or unauthorized post 1110 that is similar to or a derivative of post 1162, monitoring module 1154 may attribute any interactions with the re-post or unauthorized post 1164 back to post 1162, similar to the indexing process discussed above in conjunction with FIGS. 9A-10B.

Figure 12:
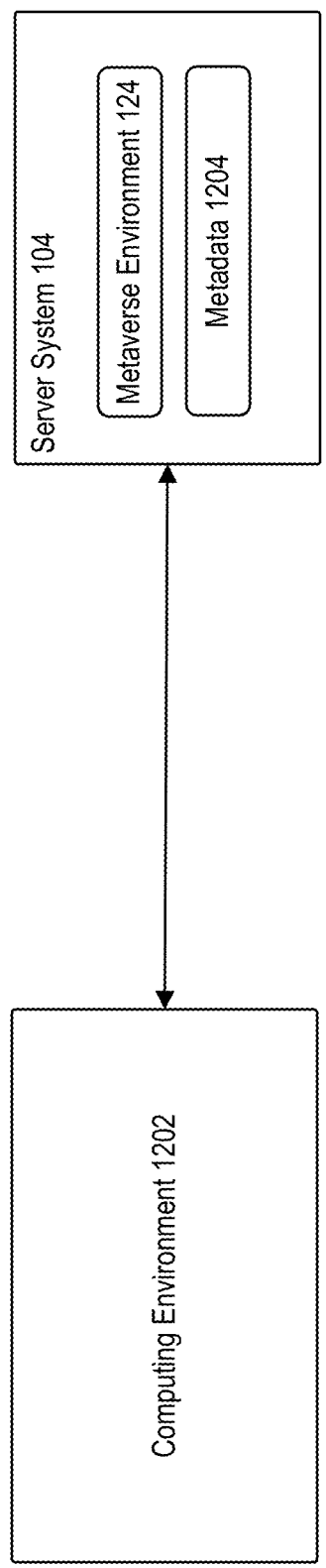
FIG. 12 is a block diagram illustrating a computing environment interacting with server system 104, according to example embodiments.

FIG. 12 is a block diagram illustrating a computing environment 1202 interacting with server system 104, according to example embodiments. As discussed above, a user's avatar may be used outside of metaverse environment 124, such as in different metaverse environments or non-metaverse environments. For example, a user can user their avatar on other platforms, such as, but not limited to, a video game environment (e.g., a custom character in a game), a streaming service, and the like. For example, a user may use their avatar as a drop-in replacement for themselves in a video conference, stream, live render, etc.

When a user wishes to user their avatar in computing environment 1202 (e.g., another metaverse environment or non-metaverse environment), computing environment 1202 may identify a three-dimensional model or base avatar that is usable in or compatible with computing environment 1202. In some embodiments, the selected three-dimensional model or base avatar may be of a file type that is compatible with computing environment 1202. In some embodiments, server system 104 may rig the avatar in accordance with the requirements of computing environment 1202. In some embodiments, a user may indicate certain metadata and/or accessories to follow their avatar to computing environment 1202. For example, As discussed above, metadata 1204 may define the customizable portions of the user's avatar, i.e., those customizations that make the user's avatar unique to the user. The user may customize their avatar for use in computing environment 1202 by adjusting the customizable portions of their avatar (e.g., gender, body type, and/or skin tone) or exporting it with accessories usable in computing environment 1202. In this manner, server system 104 may provide computing environment 1202 with the customizations, as well as the three-dimensional model or base avatar.

Using a specific example, if computing environment 1202 is Minecraft or Sandbox, server system 104 may identify a three-dimensional model or base avatar that is of a file type compatible with the Minecraft environment or Sandbox environment. In some embodiments, server system 104 may further rig the avatar in accordance with the requirements of the Minecraft environment or Sandbox environment, such that the avatar may be usable (i.e., its movements are able to be controlled by the user) and appear native to its intended environment. In this manner, the user can use their avatar or avatar accessories across different metaverse environments or non-metaverse environments.

Using another example, a user may connect their y00ts non-fungible token (NFT) to metaverse environment 124. These NFTs are represented both on Solana, a layer-1 blockchain, and Polygon, a layer-2 blockchain. By doing so, they can showcase their unique y00t within the virtual space, allowing individuals to interact as and embody their y00t avatar regardless of which blockchain they utilize. Another example could involve a user connecting their digital artwork NFT, such as a piece from the Beeple collection, to metaverse environment 124. Once connected, the user may display their artwork within a virtual gallery, allowing other users to appreciate the art and potentially engage in discussions about it. They may also interact or collaborate with the artist/painting in real-time. A user might own a virtual real estate NFT within a different metaverse, such as Decentraland. They could connect their virtual property to the metaverse environment 124, creating a bridge between the two metaverse platforms and allowing for easier navigation and interaction between them. They may view that virtual real estate as their unique identity while using out technology to view and interact with the property in real time. A user may connect their virtual fashion NFTs, like digital sneakers or apparel, to metaverse environment 124. By doing so, their avatar within the metaverse can wear the unique digital clothing, showcasing their style and potentially attracting attention from other users. A user might have an NFT representing a famous car, such as a limited-edition virtual Lamborghini. They could connect this NFT to metaverse environment 124 and use the car as a means of transportation within the virtual space, adding another layer of interactivity and personalization. They may also be able to bring the car into a virtual space and paint it, interact, or drive it using their avatar and our motion capture. A user could connect their NFT ticket for a virtual concert or event to metaverse environment 124. By doing so, they can attend the event within the metaverse platform and interact with other attendees, while also porting their digital identity or other NFTs into the environment, creating a more immersive and engaging experience. In some cases, a user may own an NFT representing a unique virtual pet or creature, like an Axie from Axie Infinity. They can connect this NFT to metaverse environment 124, allowing them to interact with their pet, train it, or even engage in battles or competitions with other users' pets. By providing users with the ability to connect various types of NFTs to metaverse environment 124, metaverse platform 120 enhances the overall user experience and encourages cross-chain or cross-metaverse interaction and collaboration.

As those skilled in the art understand, the reverse process is also possible. In some embodiments, a user could take their non-native non-fungible tokens into metaverse environment 124. For example, a user may connect their non-fungible token to metaverse environment 124 such that their non-fungible token may be utilized within metaverse environment 124. Using a more specific example, a user may utilize their Bored Ape non-fungible token with metaverse environment 124. Thus, in this manner, metaverse platform 120 may provide users with cross-chain or cross-metaverse functionality.

Figure 13:
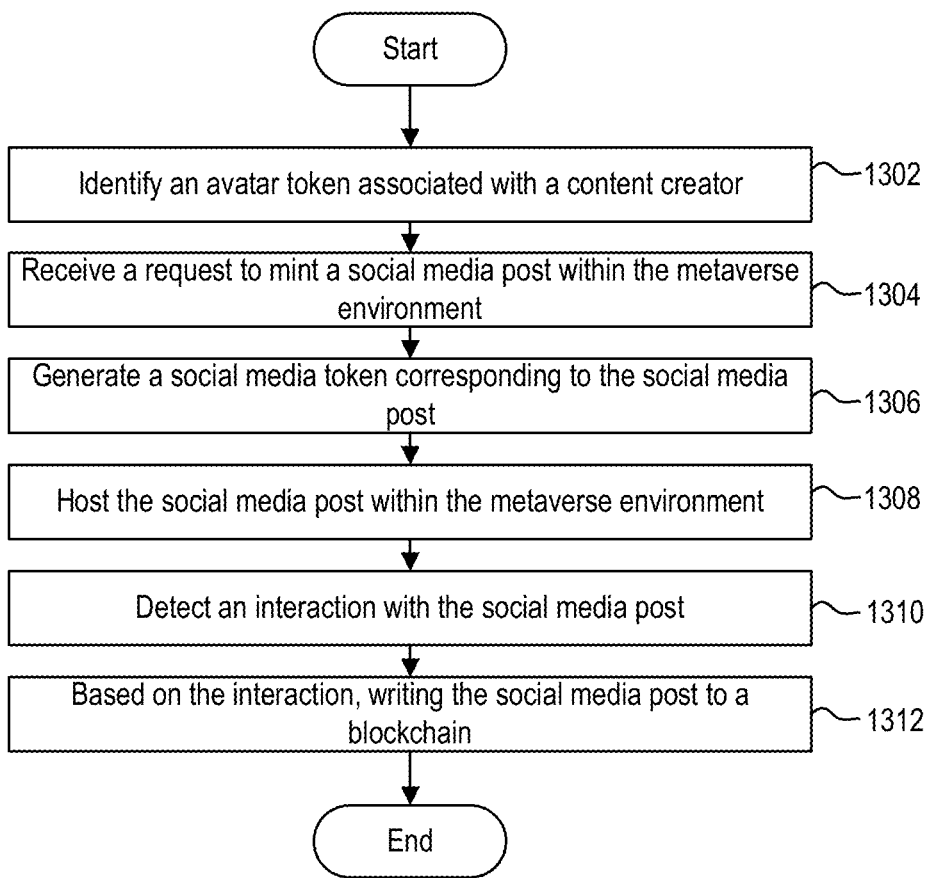
FIG. 13 is a flow diagram illustrating a method of minting a digital content, according to example embodiments.

FIG. 13 is a flow diagram illustrating a method 1300 of minting digital content, according to example embodiments. Method 1300 may begin at step 1302.

At step 1302, metaverse platform 120 may identify an avatar token associated with a user. In some embodiments, the avatar token may be pre-generated by metaverse platform 120 and transferred to the user. For example, metaverse platform 120 may be configured to generate a plurality of avatar tokens to assign to users of the platform. Metaverse platform 120 may transfer or assign ownership of the avatar tokens from an entity associated with server system 104 to the users.

In some embodiments, metaverse platform 120 may identify an avatar token responsive to receiving an avatar image from user device 102. For example, as described above in conjunction with FIG. 2, a user device 102 may upload or provide metaverse platform 120 with an avatar image indicative of an avatar of the user. Based on the avatar image and a metadata file corresponding to the avatar image, metaverse platform 120 may tokenize the avatar image provided. For example, tokenization module 210 may generate a smart contract based on the avatar image. In some embodiments, the smart contract may be representative of an ERC721 token. Metaverse platform 120 may broadcast or write the avatar token to blockchain 122. Once broadcast or written to blockchain 122, the avatar token may be provided to user device 102 for storage in the user's cryptographic wallet.

At step 1304, metaverse platform may receive a request to mint digital content within metaverse environment 124. For example, metaverse platform 120 may receive the digital content and metadata information corresponding to the digital content from user device 102. Upon receiving the digital content, metaverse platform 120 may store the digital content at a network accessible location. Upon storing the digital content in storage location 208, metaverse platform 120 may generate or receive a URL indicating the storage location of the digital content. Metaverse platform 120 may provide the URL of the digital content to the user of user device 102. The user may use the URL of the digital content to generate a metadata file corresponding to the digital content.

The digital content produced by the user may include the user's avatar. For example, a user may utilize AR software 114 to generate a video or image of the user and replace the representation of the user in the video or image with the user's avatar or insert the user's avatar into the video or image. In order to link the user's avatar token with the digital content, the metadata file may further include the URI corresponding to the tokenized avatar.

At step 1306, metaverse platform 120 may generate a digital content token corresponding to the digital content. For example, metaverse platform 120 may generate a smart contract based on the digital content and the avatar token. In some embodiments, the smart contract may further be based on any indicated accessories in the request. In some embodiments, the smart contract may be representative of an ERC721 token. In some embodiments, the smart contract may be representative of an ERC1155 token. The smart contract may include, for example, a URI corresponding to token 512, the URL that identifies a storage location of the digital content in storage location 208, and the URL that identifies a storage location of the metadata file corresponding to the digital content. In some embodiments, the smart contract may further include a URI corresponding to token 212, the URL that identifies a storage location of the avatar image in storage location 208, and the URL that identifies a storage location of the metadata file corresponding to the avatar image. In some embodiments, the smart contract may further include a URI corresponding to token 412, the URL that identifies a storage location of the accessory image in storage location 208, and the URL that identifies a storage location of the metadata file corresponding to the accessory image.

At step 1308, metaverse platform 120 may host the digital content within metaverse environment 124. In some embodiments, in addition to hosting the digital content within metaverse environment 124, metaverse platform 120 may further facilitate the hosting of the digital content via one or more social media applications and/or non-fungible token marketplaces 108.

At step 1310, metaverse platform 120 may detect an interaction with the digital content. As provided above, in some embodiments, a user's digital content token may not be written or broadcast to blockchain 122 until a user interacts (e.g., buys, sells, or transfers) with the digital content token. In other words, the tokenization referred above in step 1306 may be a "gasless" mint. Accordingly, metaverse platform 120 may monitor the digital content to determine when a trigger occurs that warrants writing the digital content token to blockchain 122. In some embodiments, metaverse platform 120 may monitor the digital content within the metaverse environment 124. In some embodiments, metaverse platform 120 may monitor the digital content in one or more non-fungible token marketplaces 108.

At step 1312, metaverse platform 120 may write the digital content token to blockchain 122 based on detecting the interaction. Responsive to identifying the interaction, metaverse platform 120 may retrieve the corresponding digital content token 512 from storage. Metaverse platform 120 may then broadcast or write the digital content token to blockchain 122. In some embodiments, metaverse platform 120 may directly write token 512 to blockchain 122.

Figure 14:
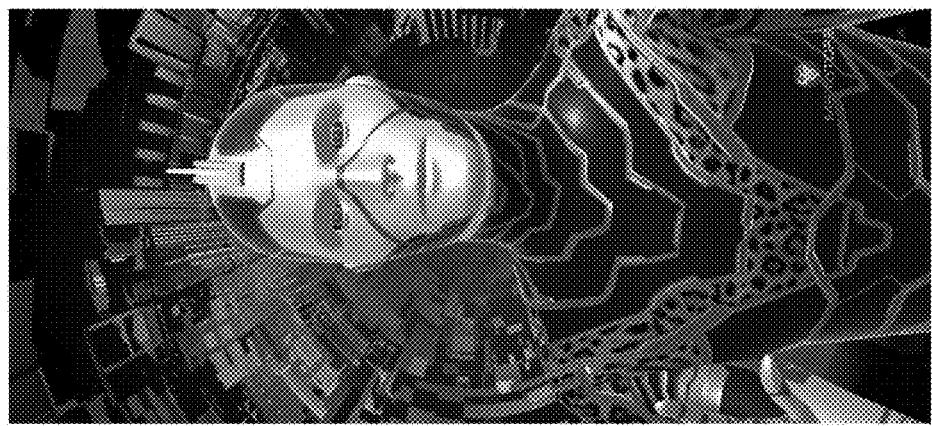
FIG. 14 illustrates an example graphical user interface (GUI), according to example embodiments.

FIG. 14 illustrates an example graphical user interface (GUI) 1400, according to example embodiments. GUI 1400 may illustrate a screen capture of user device 102, when user device 102 is utilizing full body mode of AR software 114. In such embodiments, artificial intelligence module 115 may identify a plurality of anchor points on the user's body. In this manner, AR software 114 may be able to capture the hands and rest of the user's body more accurately.

Figure 15:
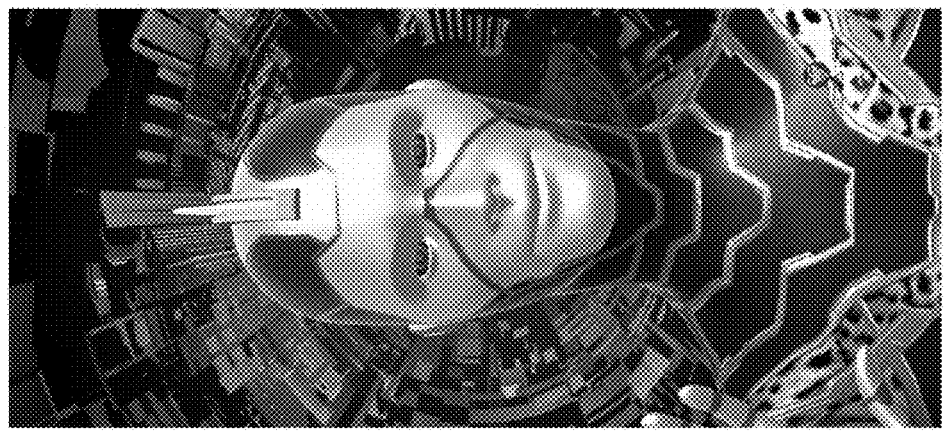
FIG. 15 illustrates an example graphical user interface (GUI), according to example embodiments.

FIG. 15 illustrates an example graphical user interface (GUI) 1500, according to example embodiments. GUI 1500 may illustrate a screen capture of user device 102, when user device 102 is utilizing selfie mode of AR software 114. In such embodiments, artificial intelligence module 115 may identify a subset of anchor points from a plurality of anchor points on the user's body. For example, because AR software 114 is in selfie mode, artificial intelligence module 115 may ignore certain anchor points, such as those associated with the user's hands and rest of their body. In this manner, AR software 114 may be able to capture the hands and rest of the user's body more accurately. In this manner, artificial intelligence module 115 may instruct AR software 114 to focus primarily on face anchor points of the user.

Figure 18:
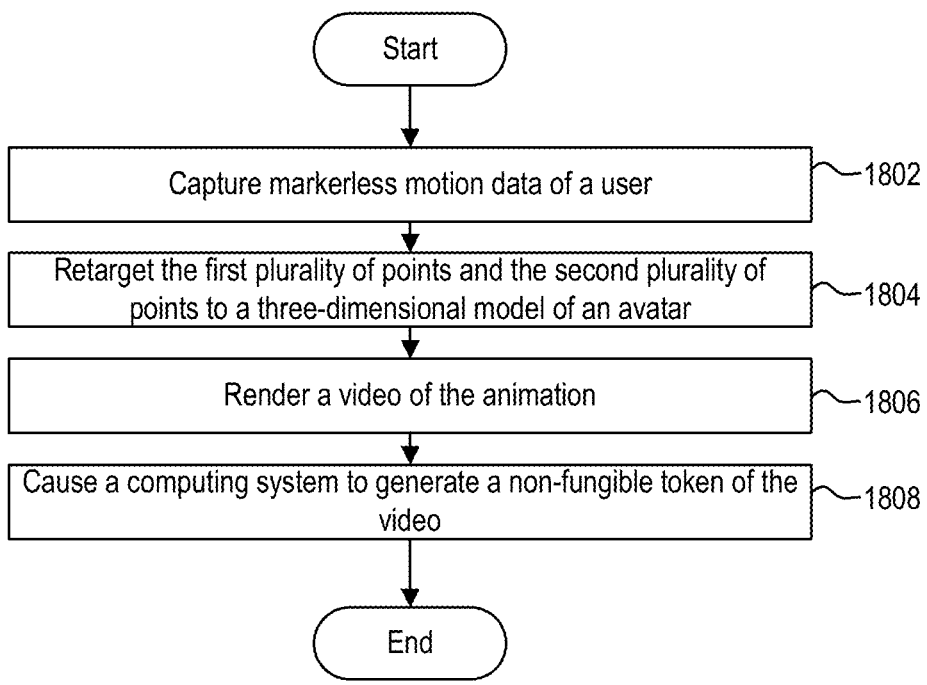
FIG. 18 is flow diagram illustrating a method of generating digital content, according to example embodiments.

FIG. 18 is flow diagram illustrating a method 1800 of generating digital content, according to example embodiments. Method 1800 may begin at step 1802.

At step 1802, client device 102 may capture markerless motion data of a user. In some embodiments, client device 102 may utilize a camera 119 of client device 102. In some embodiments, client device 102 may utilize one or more other sensors that may be available to client device 102. Exemplary sensors may include, but are not limited to, Light Detection and Ranging (LIDAR) sensors, Time-of-Flight (ToF), infrared cameras, lasers, flood illuminator, proximity sensors, and dot projectors.

In some embodiments, capturing markerless motion data of the user may include client device 102 capturing multiple sets of data, depending on the distance between the user and camera 119. For example, as discussed above in conjunction with FIG. 1, AR software 114 may be configured such that, when user device 102 is in close range of the user (e.g., when the user's face fills up a threshold percentage of the screen), artificial intelligence module 115 may be configured to lock the chest of the user to the bottom of the screen. Once the user's body is locked in, AR software 114 may then prioritize focusing on the face and hands of the user, instead of searching for the rest of the user's body. In some embodiments, rather than locking the user's body, there may be a smooth transition when the user moves from close range to far range or vice versa.

Accordingly, when the user is within a threshold distance of camera 119 (e.g., in selfie mode), AR software 114 may capture a first portion of the markerless motion data of the user. The first portion of the markerless motion data of the user may include a first plurality of points of the user to focus on. For example, the first plurality of points may include more detailed points of the user's face.

When the user is outside of the threshold distance of camera 119 (e.g., full body mode), AR software 114 may capture a second portion of the markerless motion data of the user. The second portion of the markerless motion data of the user may include a second plurality of points of the user to focus on. For example, the second plurality of points may include points associated with the user's full body (e.g., arms, legs, hands, fingers, etc.). In some embodiments, AR software 114 may ignore or disregard a portion of the first plurality of points captured when the user is within the threshold distance of camera 119. In other words, in selfie mode, the user may be able to open and close their mouth and eyes, smile, or frown; but in full body mode, the user may not be able to make as many facial expressions as they otherwise would in selfie mode because AR software 114 may focus less on processing data points on the user's face in order to capture the hands and rest of the user's body more accurately.

At step 1804, client device 102 may retarget the first plurality of points and the second plurality of points to a three-dimensional model of an avatar associated with the user. As discussed above, a user may have an avatar token that uniquely identifies the user. Client device 102 may identify the user's avatar based on the user's avatar token stored in wallet 116. Once the user's avatar is identified and/or verified, client device 102 may retarget the first plurality of points and the second plurality of points to the avatar, such that the three-dimensional model of the avatar is animated. In some embodiments, the animation may be performed in real-time or near real-time.

At step 1806, client device 102 may render a video of the animation. In some embodiments, client device 102 may render the video of the animation local to the computing system. In some embodiments, client device 102 may cause server system 104 to remotely render the video of the animation. Such online/offline process may allow the user to view a preview of the video, while server system 104 may generate a higher quality version of the video.

At step 1808, client device 102 may cause server system 104 to generate a non-fungible token of the video. For example, client device 102 may cause server system 104 to generate a token, as discussed above in conjunction with FIG. 5.

Figure 16A:
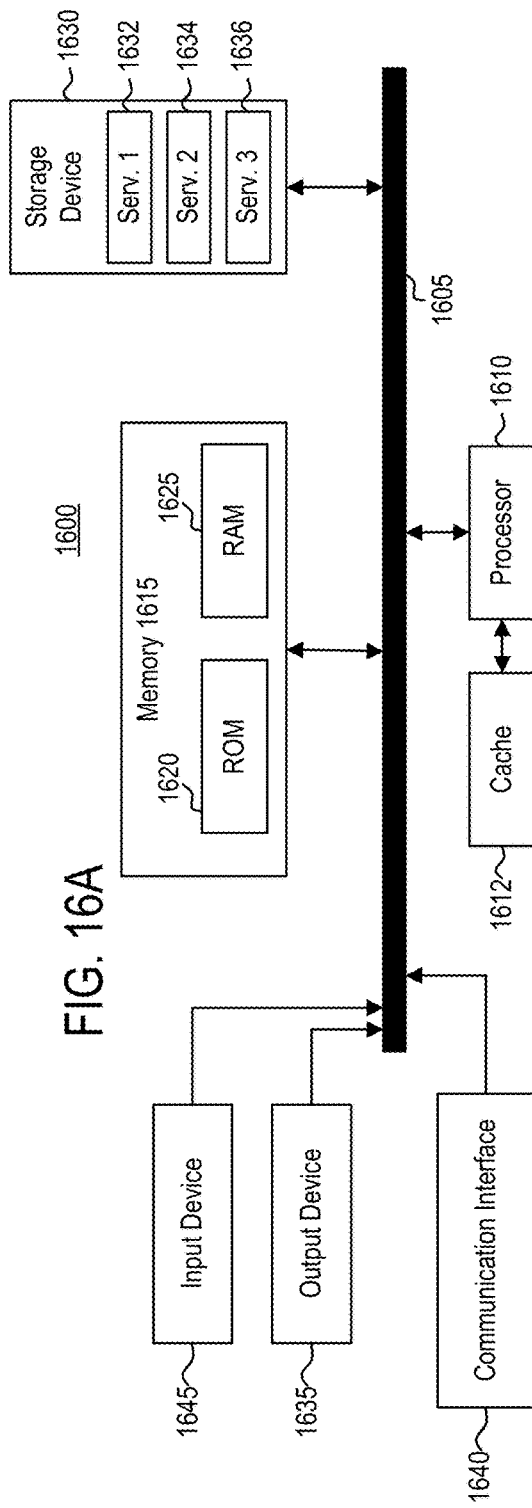
FIG. 16A illustrates a system bus computing system architecture, according to example embodiments.

FIG. 16A illustrates an architecture of system bus computing system 1600, according to example embodiments. One or more components of system 1600 may be in electrical communication with each other using a bus 1605. System 1600 may include a processor (e.g., one or more CPUs, GPUs or other types of processors) 1610 and a system bus 1605 that couples various system components including the system memory 1615, such as read only memory (ROM) 1620 and random access memory (RAM) 1625, to processor 1610. System 1600 can include a cache of high-speed memory connected directly with, in close proximity to, or integrated as part of processor 1610. System 1600 can copy data from memory 1615 and/or storage device 1630 to cache 1612 for quick access by processor 1610. In this way, cache 1612 may provide a performance boost that avoids processor 1610 delays while waiting for data. These and other modules can control or be configured to control processor 1610 to perform various actions. Other system memory 1615 may be available for use as well. Memory 1615 may include multiple different types of memory with different performance characteristics. Processor 1610 may be representative of a single processor or multiple processors. Processor 1610 can include one or more of a general purpose processor or a hardware module or software module, such as service 1 1632, service 2 1634, and service 3 1636 stored in storage device 1630, configured to control processor 1610, as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction with the system 1600, an input device 1645 can be any number of input mechanisms, such as a microphone for speech, a touch-sensitive screen for gesture or graphical input, keyboard, mouse, motion input, speech and so forth. An output device 1635 (e.g., a display) can also be one or more of a number of output mechanisms known to those of skill in the art. In some instances, multimodal systems can enable a user to provide multiple types of input to communicate with system 1600. Communication interface 1640 can generally govern and manage the user input and system output. There is no restriction on operating on any particular hardware arrangement and therefore the basic features here may easily be substituted for improved hardware or firmware arrangements as they are developed.

Storage device 1630 may be a non-volatile memory and can be a hard disk or other type of computer readable media that can store data that are accessible by a computer, such as magnetic cassettes, flash memory cards, solid state memory devices, digital versatile disks, cartridges, random access memories (RAMs) 1625, read only memory (ROM) 1620, and hybrids thereof.

Storage device 1630 can include services 1632, 1634, and 1636 for controlling the processor 1610. Other hardware or software modules are contemplated. Storage device 1630 can be connected to system bus 1605. In one aspect, a hardware module that performs a particular function can include the software component stored in a computer-readable medium in connection with the necessary hardware components, such as processor 1610, bus 1605, output device 1635 (e.g., a display), and so forth, to carry out the function.

Figure 16B:
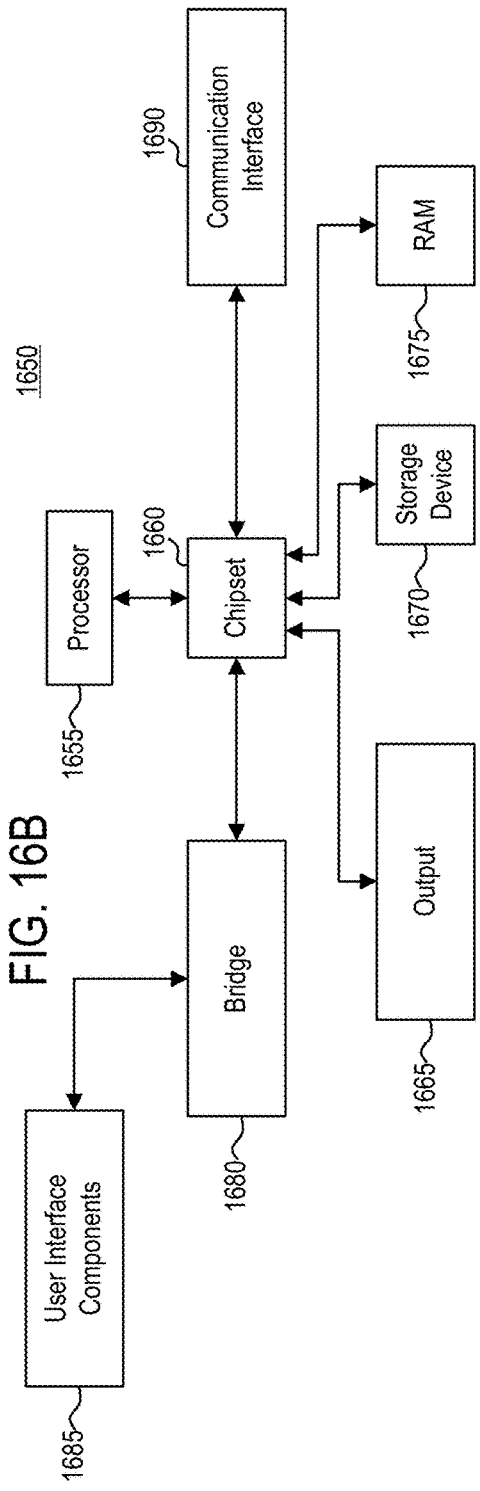
FIG. 16B illustrates a computer system having a chipset architecture, according to example embodiments.

FIG. 16B illustrates a computer system 1650 having a chipset architecture, according to example embodiments. Computer system 1650 may be an example of computer hardware, software, and firmware that can be used to implement the disclosed technology. System 1650 can include one or more processors 1655, representative of any number of physically and/or logically distinct resources capable of executing software, firmware, and hardware configured to perform identified computations. One or more processors 1655 can communicate with a chipset 1660 that can control input to and output from one or more processors 1655. In this example, chipset 1660 outputs information to output 1665, such as a display, and can read and write information to storage device 1670, which can include magnetic media, and solid-state media, for example. Chipset 1660 can also read data from and write data to storage device 1675 (e.g., RAM). A bridge 1680 for interfacing with a variety of user interface components 1685 can be provided for interfacing with chipset 1660. Such user interface components 1685 can include a keyboard, a microphone, touch detection and processing circuitry, a pointing device, such as a mouse, and so on. In general, inputs to system 1650 can come from any of a variety of sources, machine generated and/or human generated.

Chipset 1660 can also interface with one or more communication interfaces 1690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 1655 analyzing data stored in storage device 1670 or 1675. Further, the machine can receive inputs from a user through user interface components 1685 and execute appropriate functions, such as browsing functions by interpreting these inputs using one or more processors 1655.

It can be appreciated that example systems 1600 and 1650 can have more than one processor 1610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method comprising:
    capturing, by a camera associated with a computing system, markerless motion data of a user performing a movement, the capturing comprising:
        capturing a first portion of the markerless motion data of the user, wherein the first portion of the markerless motion data of the user is captured within a threshold distance of the camera, the capturing comprising identifying a first plurality of points of the user to focus on, and
        capturing a second portion of the markerless motion data of the user, wherein the second portion of the markerless motion data of the user is capture outside the threshold distance of the camera, the capturing comprising identifying a second plurality of points of the user to focus on, wherein the first plurality of points includes at least one point not included in the second plurality of points and wherein the second plurality of points includes at least one point not included in the first plurality of points;
    retargeting, by the computing system, the first plurality of points and the second plurality of points to a three-dimensional model of an avatar associated with the user, and wherein retargeting the first plurality of points and the second plurality of points animates the three-dimensional model of the avatar to perform the movement performed by the user as the user performs the movement in real-time; and
    in real-time, locally rendering, by the computing system, a video comprising the markerless motion data of the user retargeted to the three-dimensional model of the avatar causing hands, face, and body of the avatar to be animated in real-time.

2. The method of claim 1, further comprising:
    causing, by the computing system, a remote server to generate a second video remote from the computing system, the second video having a higher quality than the video rendered local to the computing system.

3. The method of claim 2, wherein the local rendering provides a preview of content in the video.

4. The method of claim 1, further comprising:
    detecting a change in distance between the user and the camera, wherein the change in distance is from being within the threshold distance of the camera and being outside of the threshold distance of the camera; and
    smoothly transitioning between capturing the first plurality of points and the second plurality of points.

5. The method of claim 1, wherein the first plurality of points comprises a first set of points of the user's face.

6. The method of claim 5, wherein the second plurality of points comprises a second set of points of the user's face and a third set of points of the user's full body, wherein the second set of points does not include at least one point in the first set of points.

7. The method of claim 1, further comprising:
    merging, by the computing system, the first plurality of points and the second plurality of points.

8. A non-transitory computer readable medium comprising one or more sequences of instructions, which, when executed by a processor, causes a computing system to perform operations comprising:
    capturing, by a camera associated with the computing system, markerless motion data of a user performing a movement, the capturing comprising:
        capturing a first portion of the markerless motion data of the user, wherein the first portion of the markerless motion data of the user is captured within a threshold distance of the camera, the capturing comprising identifying a first plurality of points of the user to focus on, and capturing a second portion of the markerless motion data of the user, wherein the second portion of the markerless motion data of the user is capture outside the threshold distance of the camera, the capturing comprising identifying a second plurality of points of the user to focus on, wherein the first plurality of points includes at least one point not included in the second plurality of points and wherein the second plurality of points includes at least one point not included in the first plurality of points;

retargeting, by the computing system, the first plurality of points and the second plurality of points to a three-dimensional model of an avatar associated with the user, and wherein retargeting the first plurality of points and the second plurality of points animates the three-dimensional model of the avatar to perform the movement performed by the user as the user performs the movement in real-time; and in real-time, locally rendering, by the computing system, a video comprising the markerless motion data of the user retargeted to the three-dimensional model of the avatar causing hands, face, and body of the avatar to be animated in real-time.

9. The non-transitory computer readable medium of claim 8, further comprising:

causing, by the computing system, a remote server to generate a second video remote from the computing system, the second video having a higher quality than the video rendered local to the computing system.

10. The non-transitory computer readable medium of claim 9, wherein the local rendering provides a preview of content in the video.

11. The non-transitory computer readable medium of claim 8, further comprising:

detecting a change in distance between the user and the camera, wherein the change in distance is from being within the threshold distance of the camera and being outside of the threshold distance of the camera; and smoothly transitioning between capturing the first plurality of points and the second plurality of points.

12. The non-transitory computer readable medium of claim 8, wherein the first plurality of points comprises a first set of points of the user's face.

13. The non-transitory computer readable medium of claim 12, wherein the second plurality of points comprises a second set of points of the user's face and a third set of points of the user's full body, wherein the second set of points does not include at least one point in the first set of points.

14. The non-transitory computer readable medium of claim 8, further comprising:

merging, by the computing system, the first plurality of points and the second plurality of points.

15. A system comprising:

a processor, and a memory having programming instructions stored thereon, which, when executed by the processor, causes the system to perform operations comprising:

capturing, by a camera, markerless motion data of a user performing a movement, the capturing comprising:

capturing a first portion of the markerless motion data of the user, wherein the first portion of the markerless motion data of the user is captured within a threshold distance of the camera, the capturing comprising identifying a first plurality of points of the user to focus on, and capturing a second portion of the markerless motion data of the user, wherein the second portion of the markerless motion data of the user is capture outside the threshold distance of the camera, the capturing comprising identifying a second plurality of points of the user to focus on, wherein the first plurality of points includes at least one point not included in the second plurality of points and wherein the second plurality of points includes at least one point not included in the first plurality of points;

retargeting the first plurality of points and the second plurality of points to a three-dimensional model of an avatar associated with the user, and wherein retargeting the first plurality of points and the second plurality of points animates the three-dimensional model of the avatar to perform the movement performed by the user as the user performs the movement in real-time; and in real-time, locally rendering a video comprising the markerless motion data of the user retargeted to the three-dimensional model of the avatar causing hands, face, and body of the avatar to be animated in real-time.

16. The system of claim 15, further comprising:

causing a remote server to generate a second video remote from the system, the second video having a higher quality than the locally rendered video.

17. The system of claim 16, wherein the local rendering provides a preview of content in the video.

18. The system of claim 15, further comprising:

detecting a change in distance between the user and the camera, wherein the change in distance is from being within the threshold distance of the camera and being outside of the threshold distance of the camera; and smoothly transitioning between capturing the first plurality of points and the second plurality of points.

19. The system of claim 15, wherein the first plurality of points comprises a first set of points of the user's face.

20. The system of claim 19, wherein the second plurality of points comprises a second set of points of the user's face and a third set of points of the user's full body, wherein the second set of points does not include at least one point in the first set of points.

* * * * *